US007266874B2

(12) United States Patent
Ernst et al.

(10) Patent No.: US 7,266,874 B2
(45) Date of Patent: Sep. 11, 2007

(54) METHOD OF INSTALLING A SELF-DRILLING ANCHOR

(75) Inventors: Richard J. Ernst, San Diego, CA (US); George G. Dewey, Palatine, IL (US); George B. Dowse, Huntley, IL (US); James W. Robinson, Mundelein, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/215,650

(22) Filed: Aug. 30, 2005

(65) Prior Publication Data

US 2005/0283961 A1 Dec. 29, 2005

Related U.S. Application Data

(62) Division of application No. 10/844,706, filed on May 12, 2004.

(51) Int. Cl.
*B23P 11/00* (2006.01)
*F16B 13/06* (2006.01)

(52) U.S. Cl. .................. 29/432; 29/525.01; 29/525.12; 29/525.13; 29/525.11; 411/44; 411/2

(58) Field of Classification Search .................. 29/432, 29/525.01, 525.11, 525.12, 525.13; 411/14.5, 411/15, 16, 29, 30, 31, 44, 45, 60.2, 71, 72, 411/80.1, 80.2, 80.5, 387.8, 411, 412, 413, 411/2, 3, 39, 40, 42, 5, 910
See application file for complete search history.

(56) References Cited

U.S. PATENT DOCUMENTS 2,883,720 A * 4/1959 Hansen ...................... 29/432.2
3,117,486 A * 1/1964 Matthews ................... 411/417
3,595,124 A * 7/1971 Lindstrand et al. ............ 411/2

(Continued)

FOREIGN PATENT DOCUMENTS

DE 040 16 724 11/1991

(Continued)

OTHER PUBLICATIONS

SPIT Mini DRIVA product sheets Nov. 23, 2004 (2 pages).

*Primary Examiner*—Essama Omgba
(74) *Attorney, Agent, or Firm*—Lisa M. Soltis; Mark W. Croll; Beem Patent Law Firm

(57) ABSTRACT

A method of installing a self drilling anchor for use in a friable material mounted on a member comprising an elongated body having an axis, an axial bore adapted to receive an elongated fastener, a flared end having torque transmitting surfaces therein, a proximal portion, an intermediate portion, a distal portion, and a drilling tip generally opposite the flared end, wherein the proximal portion has a threaded exterior having a root, a crest diameter, and a thread height, the intermediate portion has a threaded exterior having a root, a crest diameter substantially smaller than the crest diameter of the proximal portion, and a thread height substantially smaller than the thread height of the proximal portion, and the distal portion has a threaded exterior with a root that tapers toward the drilling tip, a crest diameter substantially smaller than the crest diameter of the proximal portion, and a thread height substantially smaller than the thread height of the proximal portion.

7 Claims, 8 Drawing Sheets

U.S. PATENT DOCUMENTS

| | | | | |
|---|---|---|---|---|
| 3,641,866 | A | | 2/1972 | Mortensen |
| 4,601,625 | A | | 7/1986 | Ernst |
| 4,763,456 | A | | 8/1988 | Giannuzzi |
| 4,892,429 | A | | 1/1990 | Giannuzzi |
| 5,039,262 | A | | 8/1991 | Giannuzzi |
| 5,160,225 | A | | 11/1992 | Chern |
| 5,190,425 | A | | 3/1993 | Wieder et al. |
| 5,234,299 | A | | 8/1993 | Giannuzzi |
| 5,308,203 | A | | 5/1994 | McSherry et al. |
| 5,449,257 | A | * | 9/1995 | Giannuzzi .................... 411/31 |
| 5,482,418 | A | | 1/1996 | Giannuzzi |
| 5,486,079 | A | * | 1/1996 | Martin et al. ............... 411/392 |
| 5,499,892 | A | * | 3/1996 | Reed ............................. 411/5 |
| 5,529,449 | A | | 6/1996 | McSherry et al. |
| 5,536,121 | A | | 7/1996 | McSherry |
| 5,556,220 | A | * | 9/1996 | Lautenschlager et al. ... 403/298 |
| 5,558,479 | A | | 9/1996 | McElderry |
| 5,625,994 | A | * | 5/1997 | Giannuzzi .................... 52/705 |
| 5,692,864 | A | | 12/1997 | Powell et al. |
| 5,752,792 | A | | 5/1998 | McSherry |
| 5,833,415 | A | | 11/1998 | McSherry |
| 5,882,162 | A | * | 3/1999 | Kaneko ...................... 411/411 |
| 5,991,998 | A | * | 11/1999 | Kaneko ..................... 29/432.2 |
| 6,079,921 | A | | 6/2000 | Gauthier et al. |
| 6,139,236 | A | | 10/2000 | Ito |
| 6,186,716 | B1 | | 2/2001 | West et al. |
| 6,196,780 | B1 | | 3/2001 | Wakai et al. |
| 6,250,865 | B1 | | 6/2001 | McSherry |
| 6,261,039 | B1 | * | 7/2001 | Reed .......................... 411/178 |
| 6,354,779 | B1 | | 3/2002 | West et al. |
| 6,382,892 | B1 | | 5/2002 | Hempfling |
| 6,419,436 | B1 | | 7/2002 | Gaudron |
| 6,679,661 | B2 | * | 1/2004 | Huang ......................... 411/29 |
| 6,846,142 | B2 | | 1/2005 | Gens |
| 6,872,042 | B2 | * | 3/2005 | Panasik et al. ............. 411/481 |
| 2005/0079027 | A1 | * | 4/2005 | Ernst et al. .................... 411/44 |
| 2005/0084360 | A1 | * | 4/2005 | Panasik et al. ............... 411/44 |
| 2005/0175429 | A1 | * | 8/2005 | Panasik et al. ............ 411/80.1 |
| 2006/0165506 | A1 | * | 7/2006 | Panasik et al. ............... 411/30 |

FOREIGN PATENT DOCUMENTS

| | | | | |
|---|---|---|---|---|
| DE | 295 02 052 | U | | 3/1995 |
| DE | 295 09 487 | U | | 3/1995 |
| DE | 093 01 098 | | | 1/1997 |
| DE | 19 852 339 | | | 5/2000 |
| EP | 0 951 869 | | | 10/1999 |
| EP | 965767 | A1 | * | 12/1999 |
| EP | 1 298 331 | A | | 4/2003 |
| EP | 1522744 | A1 | * | 4/2005 |
| FR | 439 431 ET 439 432 | | | 9/1996 |
| GB | 2 357 130 | A | | 6/2001 |
| JP | 2005121224 | A | * | 5/2005 |
| WO | WO-1999/05420 | | | 2/1999 |
| WO | WO-2004/053341 | | | 6/2004 |
| WO | WO-2004/079209 | | | 9/2004 |
| WO | WO-2004/079210 | | | 9/2004 |
| WO | WO/2005/038275 | | | 4/2005 |

* cited by examiner

METHOD OF INSTALLING A SELF-DRILLING ANCHOR

This application is a division of U.S. patent application Ser. No. 10/844,706, filed on May 12, 2004 which claims benefit of 06/510,708 filed Oct. 10, 2003.

BACKGROUND OF THE INVENTION

1. Field of the Invention

The present invention is directed to a method of installing an anchor for use in a friable material, particularly to a self-drilling anchor to be used in drywall mounted to a member.

2. Description of the Related Art

Because drywall is a friable material, mounting articles thereto can be difficult. In the past, at least three methods have been used. For light weight articles, small plastic expansion anchors have been used. These expansion anchors have typically required three steps to install: first, a hole is drilled into the drywall; second, the anchor insert is driven into the drilled hole; and finally, a threaded fastener is advanced into the anchor, spreading the anchor into engagement with the drywall. However, expansion anchors can typically hold light loads only.

For heavy duty applications, toggle bolts have been used. While toggle bolts have been effective, they are also generally expensive because they involve parts which must move relative to one another. Toggle bolts also have been known to be difficult to install.

Self-drilling anchors for mounting heavier loads also have been used. These self-drilling anchors typically are installed by drilling into the drywall with the anchor itself. The anchor also includes threading having a high thread height to provide a high pullout in the drywall. Examples of self-drilling anchors include the anchor sold under the trademark E-Z ANCOR manufactured by ITW Buildex, and those disclosed in U.S. Pat. Nos. 4,601,625, 5,190,425, and 5,558,479, all of which are assigned to the assignee of this application.

Self-drilling anchors have proved effective for holding higher loads when installed in drywall alone. However, in most cases the drywall is mounted to wood support members, or studs, that are unseen by the user, and typically the location of these support members are unknown and unchecked by the user. When a user of a typical self-drilling fastener attempts to install the anchor in drywall at a location of a support member, the anchor is unable to drill into the support member, causing the anchor to spin in place so that the anchor's high threading strips out the drywall, resulting in failure of the anchor and creating an unsightly scar on the wall. Even if the anchor is able to drill into the support member slightly, the anchors have been known to tightly engage the support member and break due to torsion on the anchor.

What is needed is a self-drilling fastener for use in drywall that can be installed either in drywall only, or in drywall and a support member capable of handling a heavy load.

BRIEF SUMMARY OF THE INVENTION

A novel self drilling anchor is provided for use in a friable material mounted on support member, the self drilling fastener including an elongated body having an axis, an axial bore adapted to receive an elongated anchor, a flared end having torque transmitting surfaces therein, a proximal portion, an intermediate portion, a distal portion, and a drilling tip generally opposite the flared end, wherein the proximal portion has a threaded exterior having a root, a crest diameter, and a thread height, the intermediate portion has a threaded exterior having a root, a crest diameter substantially smaller than the crest diameter of the proximal portion, and a thread height substantially smaller than the thread height of the proximal portion, and the distal portion has a threaded exterior with a root that tapers toward the drilling tip, a crest diameter substantially smaller than the crest diameter of the proximal portion, and a thread height substantially smaller than the thread height of the proximal portion.

In one embodiment, the self drilling anchor comprises an elongated body having an axis, an axial bore having splines adapted to receive an elongated threaded fastener, a flared end having torque transmitting surfaces therein, a proximal portion, an intermediate portion, a distal portion, and a drilling tip generally opposite the flared end, wherein the intermediate portion tapers toward the distal portion, and the distal portion tapers toward the drilling tip, wherein the body includes a first exterior thread disposed on the proximal portion, the intermediate portion, and the distal portion and a second exterior thread disposed on the distal portion, the second exterior thread being between the first exterior thread, wherein each of the first exterior thread and the second exterior thread has a crest and a lead proximate the drilling tip, wherein the first exterior thread at the proximal portion has a crest diameter and a high thread height for gripping the friable material, the first exterior thread at the intermediate portion has a crest diameter substantially smaller than the crest diameter at the proximal portion and a thread height substantially smaller than the high thread height at the proximal portion, and the first exterior thread at the distal portion has a crest diameter substantially smaller than the crest diameter at the proximal portion and a thread height substantially smaller than the high thread height at the proximal portion, the first exterior thread having a transition zone between the high thread height at the proximal portion and the thread height at the intermediate portion, wherein the second exterior thread has a crest diameter substantially smaller than the crest diameter of the first exterior thread at the proximal portion and a thread height substantially smaller than the high thread height of the first exterior thread at the proximal portion.

In another embodiment, the self drilling anchor comprises an elongated body having an axis, an axial bore having splines adapted to receive an elongated threaded fastener having a tip, a flared end having torque transmitting surfaces therein, a proximal portion, an intermediate portion, a distal portion, and a drilling tip extending to an original position generally opposite the flared end, wherein the intermediate portion tapers toward the distal portion and the distal portion tapers toward the drilling tip, wherein the body includes a first exterior thread disposed on the proximal portion, the intermediate portion, and the distal portion and a second exterior thread disposed on the distal portion, the second exterior thread being between the first exterior thread, wherein the first exterior thread and the second exterior thread each has crest and a lead proximate the drilling tip, wherein the first exterior thread at the proximal portion has a crest diameter and a high thread height, the first exterior thread at the intermediate portion has a crest diameter substantially smaller than the crest diameter at the proximal portion and a thread height substantially smaller than the high thread height at the proximal portion, and the first exterior thread at the distal portion has a crest diameter substantially smaller than the crest diameter at the proximal portion and a thread height substantially smaller than the high thread height at the proximal portion, the first exterior thread having a transition zone between the high thread height at the proximal portion and the thread height at the intermediate portion, wherein the second exterior thread has a crest diameter substantially smaller than the crest diameter of the first exterior thread at the proximal portion and a thread height substantially smaller than the high thread height of the first exterior thread at the proximal portion, and means for permitting the elongated fastener tip to extend beyond the original position of the drilling tip.

A method of installing an anchor and an elongated fastener in a friable material mounted on a member is also provided including the steps of providing an elongated anchor having an axis, an axial bore adapted to receive an elongated fastener, a flared end having torque transmitting surfaces therein, a proximal portion, an intermediate portion, a distal portion, and a drilling tip generally opposite the flared end, wherein the proximal portion has a threaded exterior with a root, a crest diameter, and a thread height, the intermediate portion has a threaded exterior with a root, a crest diameter substantially smaller than the crest diameter of the proximal portion, and a thread height substantially smaller than the thread height of the proximal portion, and the distal portion has a threaded exterior with a root that tapers toward the drilling tip, a crest diameter substantially smaller than the crest diameter of the proximal portion, and a thread height substantially smaller than the thread height of the proximal portion, driving the anchor into the friable material so that the distal portion drills through the friable material and into the member, and the proximal portion threaded exterior engages the friable material, and inserting the elongated fastener into the axial bore.

These and other features and advantages are evident from the following description of the present invention, with reference to the accompanying drawings.

DETAILED DESCRIPTION OF THE INVENTION

Figure 3:
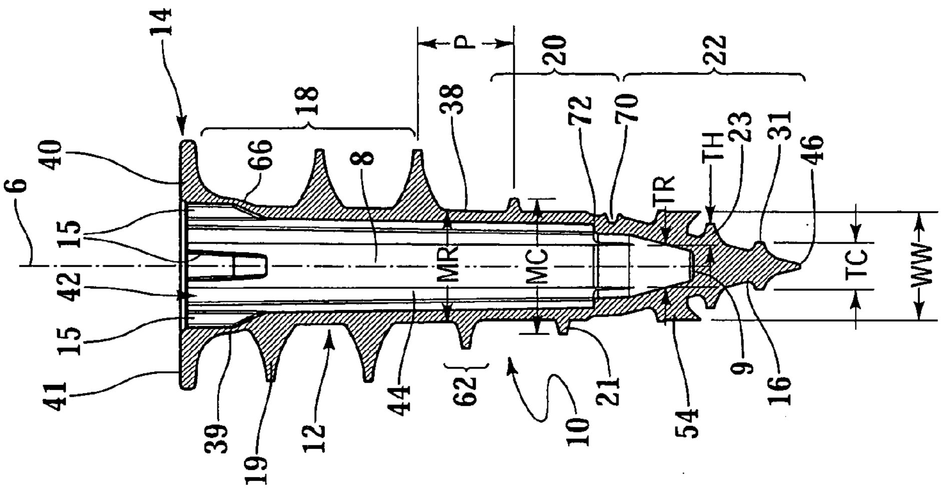
FIG. 3 is a side-sectional view of the break-off tip embodiment of the self drilling anchor.

Referring to FIGS. 1-4, a novel self-drilling anchor 10 is shown. Here, anchor 10 is described in its general aspects and then, below, with respect to several exemplary embodiments, including the break-off tip embodiment shown in FIGS. 1-4, and 7.

Anchor 10 is for use in a friable material, such as drywall 1, mounted on a member, such as a support member 2, the novel anchor 10 having an elongated body 12 with an axis 6, an axial bore 8 adapted to receive an elongated mounting fastener 4 (see FIG. 7), a flared end 14 having torque transmitting surfaces 15 therein, a proximal portion 18 proximate flared end 14, an intermediate portion 20, a distal portion 22, and a drilling tip 16 generally opposite flared end 14, wherein proximal portion 18 has a threaded exterior, such as drywall gripping threading 19, having a root 26, a crest 27 with a crest diameter DC, and a thread height DH, intermediate portion 20 has a threaded exterior, such as member gripping threading 21, having a root 28, a crest 29 with a crest diameter MC substantially smaller than drywall gripping threading crest diameter DC, and a thread height MH substantially smaller than drywall gripping thread height DH, and distal portion 22 has a threaded exterior, such as drilling threading 23, having a root 30 that tapers toward drilling tip 16, a crest 31 with a crest diameter TC substantially smaller than drywall gripping threading crest diameter DC, and a thread height TH substantially smaller than drywall gripping thread height DH.

Figure 7:
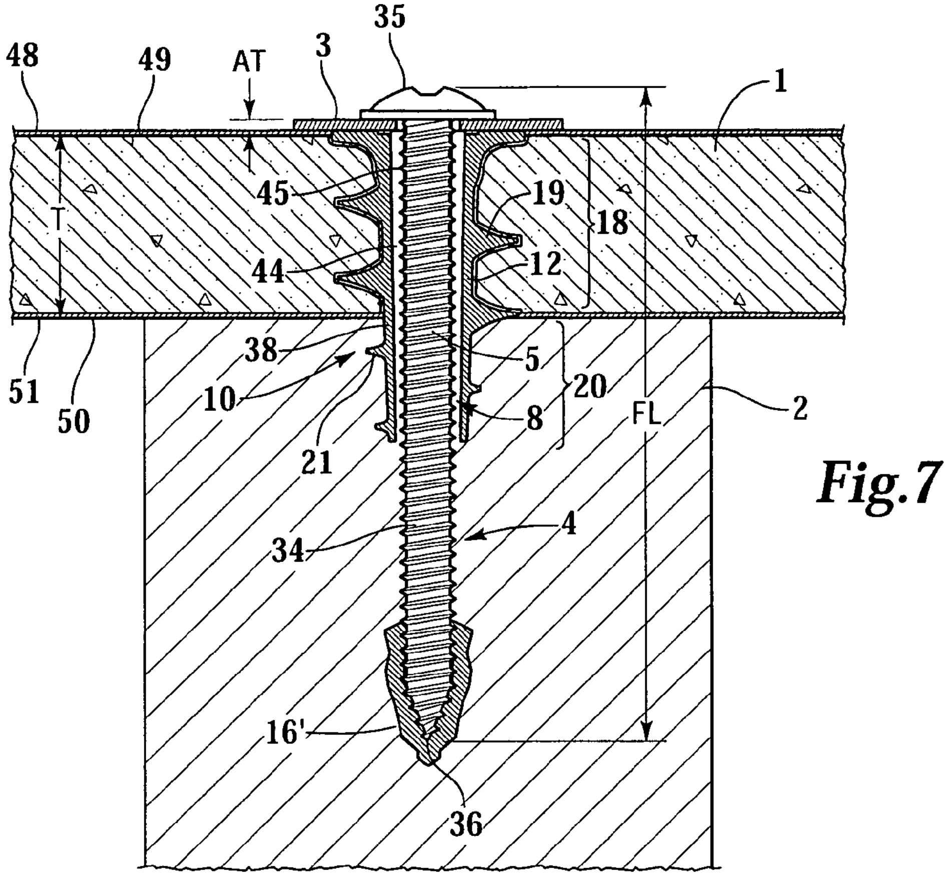
FIG. 7 is a side-sectional view of the break-off tip embodiment of an installed self drilling anchor with a mounting fastener inserted through the self drilling anchor.

Anchor 10 is for driving into drywall 1 for mounting an article 3 to drywall 1, as shown in FIG. 7. After anchor 10 is installed, a mounting fastener 4 is inserted through article 3 and into bore 8 of anchor 10. Anchor 10 provides stronger engagement and higher pullout strength than mounting fastener 4 alone. Anchor 10 can be used in a manner similar to traditional self-drilling anchors when it is being installed in drywall 1 only. However, anchor 10 includes features that allow anchor 10 to penetrate and engage in a support member 2, such as a wood support stud, and that provide added strength to withstand the large forces of driving anchor 10 into drywall 1 and support member 2.

The friable material can be one of several friable materials used in construction wherein it is desired to mount an article 3 to the friable material in order to increase the amount of load that the friable material can withstand. An example of the friable material is gypsum based drywall 1, such as the gypsum drywall sold under the trademark SHEETROCK by United States Gypsum. Drywall 1 typically has a thickness T of ½ inch or ⅝ inch, but it can be obtained in other thicknesses, such as ⅜ inch.

Typically, friable materials such as drywall 1 are mounted to a member, such as a wood structural support member, plywood, or another friable material, such as another layer of drywall. The member can be a support member 2, such as a wood support member, for example a 2×4 stud or the like, evenly spaced from other wood studs, e.g. every 16 inches, or a metal support member, such as a steel support stud. Support members are substantially more resistant to pullout than drywall 1 because they are much less likely to break apart. Although anchor 10 can be used on drywall 1 mounted to another sheet of drywall, or other friable materials, the present invention will be described for use with support members 2 such as a wood support stud.

Turning to FIG. 7, mounting fastener 4 is preferably a threaded fastener, such as a mounting screw, having an elongate shank 34 with a head 35 at one end and a tip 36 at the other. Shank 34 of mounting fastener 4 includes threading 5 which engages with interior bore 8 of anchor 10. Threading 5 of mounting fastener 4 can be of a standardized thread form, such as Unified Coarse (UNC) or Unified Fine (UNF) threading, or threading 5 can be of a specialized thread form. Mounting fastener 4 can be a standard #6, #7 or #8 UNC screw, wherein head 35 has a Phillips recess, and a total elongate length FL of between about ½ inch inches and about 2 inches or more, preferably about 1¼ inches. Mounting fastener 7 can have a thread density of between about 8 threads per inch and about 18 threads per inch, preferably about 15 threads per inch.

Mounting fastener 4 can have different lengths to accommodate different thicknesses AT of article 3. Preferably, anchor 10 is designed so that a long mounting fastener 4 can be used with anchor 10 if article 3 is relatively thin, as shown in FIG. 7, or relatively thick, in which case there is a need for greater length to achieve engagement with anchor 10. Anchor 10 allows for mounting fasteners 4 that are longer than anchor 10 because anchor 10 has a geometry that allows mounting fastener tip 36 to extend beyond the original position of drilling tip 16, as described below. Because anchor 10 allows tip 36 of mounting fastener 4 to extend past drilling tip 16, anchor 10 can be shorter than mounting fastener 4. A shorter anchor 10 is preferred because it limits the depth of embedment in support member 2, thereby reducing the associated installation torque, and because it is less expensive to manufacture, easier to handle and to keep stable during installation, and it has a shorter drive time so that a user can install a plurality of anchors 10 in a relatively short period of time with a minimum of effort.

Anchor

Figure 2:
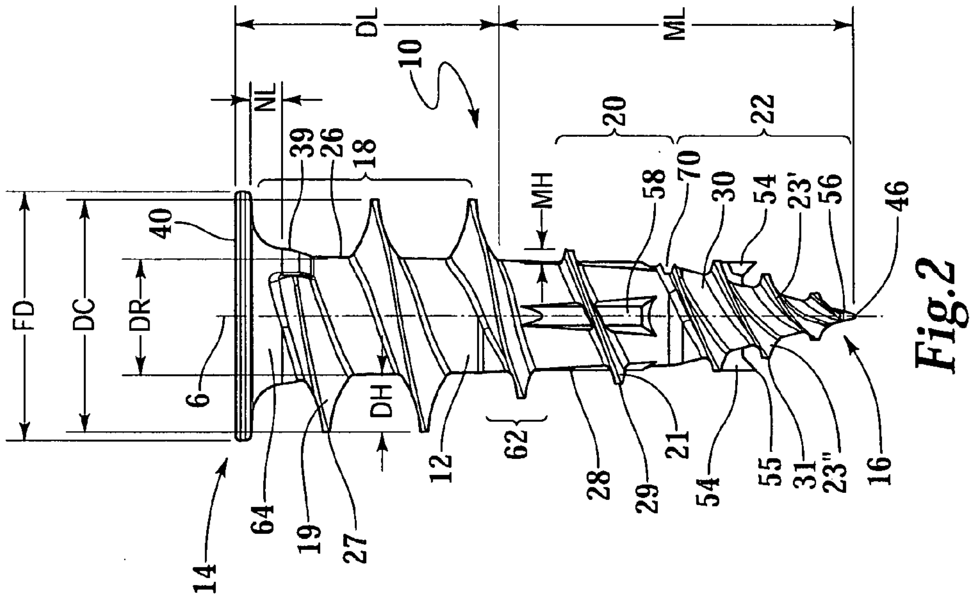
FIG. 2 is a side view of the self drilling anchor of the present invention, showing a break-off tip embodiment.

Turning to FIGS. 2, 3, and 7, anchor 10 includes a generally hollow elongate body 12 having an axis 6, a thin wall 38 surrounding an axial bore 8 adapted to receive mounting fastener 4, wherein axial bore 8 has an elongated generally cylindrical portion and a set of splines 44 adapted to receive elongated threaded mounting fastener 4. A flange 40 is located at flared end 14 of body 12, wherein flange 40 includes torque transmitting surfaces therein, such as surfaces 15 in a Phillips-type recess 42, which may be a Phillips Square Drive to minimize cam-out, an axially extending proximal portion 18 proximate flared end 14, an axially extending intermediate portion 20 between proximal portion 18 and distal portion 22, an axially extending distal portion 22, and a drilling tip 16 generally opposite flared end 14, wherein intermediate portion 20 tapers toward distal portion 22 and distal portion 22 tapers toward drilling tip 16. Anchor 10 is preferably manually drivable by a hand-powered screwdriver, which may be a Phillips screwdriver or the like, or by a power driver.

Figure 1:
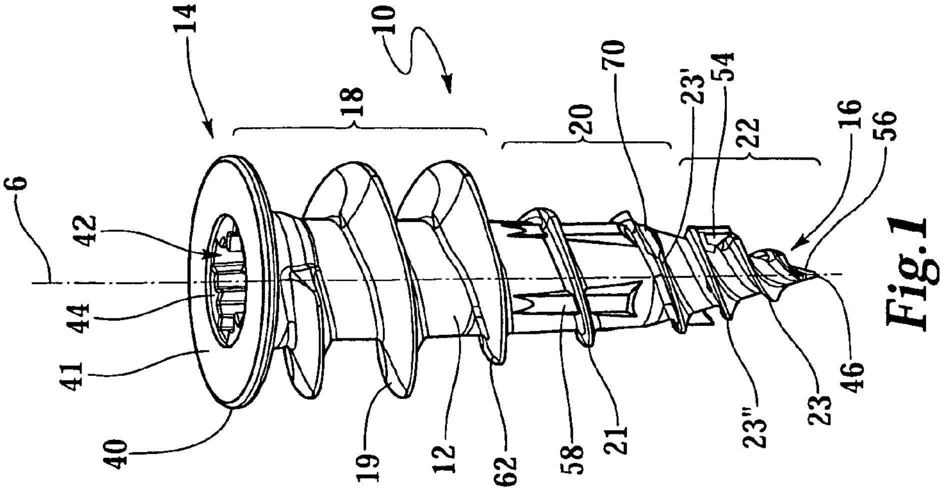
FIG. 1 is a perspective view of a self drilling anchor according to the present invention.

In the embodiment shown in FIGS. 1–3, anchor body 12 includes a first exterior thread 19, 21, 23' disposed on proximal portion 18, intermediate portion 20, and distal portion 22 and a second exterior thread 23" disposed on distal portion 22, where second exterior thread 23" is between first exterior thread 23' on distal portion 22. Both first exterior thread 19, 21, 23' and second exterior thread 23" have a crest and a lead 56 proximate drilling tip 16. First exterior thread 19 at proximal portion 18 has a crest diameter DC and a high thread height DH for gripping drywall 1. First exterior thread 21 at intermediate portion 20 has a crest diameter MC substantially smaller than crest diameter DC and a thread height MH substantially smaller than the high thread height DH. First exterior thread 23' at distal portion 22 has a crest diameter TC substantially smaller than crest diameter DC and a thread height TH substantially smaller than the high thread height DH. There is a transition zone 62 on first thread 19, 21, 23' between the high thread height DH and the thread height MH. Second exterior thread 23" has a crest diameter TC substantially smaller than crest diameter DC and a thread height TH substantially smaller than the high thread height DH.

Continuing with FIG. 7, preferably anchor 10 has a means for permitting mounting fastener tip 36 to extend beyond the original position of drilling tip 16 of anchor 10 when anchor 10 is installed. Anchor 10 can have a thin wall 38 to allow mounting fastener 4 to pierce through anchor 10 so that mounting fastener tip 36 can extend past drilling tip 16 of anchor 10. Thin wall 38 allows the root diameter of anchor 10 to be smaller, resulting in a lower required installation torque. Additionally, thin wall 38 allows anchor 10 to receive mounting fasteners 4 having relatively large outer diameters, while still having an anchor 10 with a relatively small root. For example, if wall 38 has a thickness of about 0.02 inch, and a set of splines 44 that are large enough, as described below, anchor 10 can receive a #6 threaded mounting fastener, having an outer diameter of about 0.14 inch, or a #8 threaded mounting fastener, having an outer diameter of about 0.16 inch without the mounting fastener threading 5 tapping into wall 38. Also, thin wall 38 allows anchor 10 to be made from less material so that anchor 10 is less expensive to manufacture. In one embodiment, the thickness of anchor wall 38 is between about 0.01 inch and about 0.05 inch, preferably between about 0.015 inch and about 0.03 inch, still more preferably about 0.025 inch.

In the embodiment shown in FIG. 3, splines 44 are included in bore 8 of anchor 10 for engaging with mounting fastener 4. Mounting fastener threading 5 taps mating threads 45 into splines 44 so that mounting fastener 4 is threadingly engaged with splines 44, and hence with anchor 10. Splines 44 also add structural support to anchor 10 so that body 12 of anchor 10 can withstand higher torsion forces when driven through drywall 1 and support member 2.

The effective inner diameter of bore 8 with splines 44 should be smaller than the outside diameter, or crest diameter of mounting fastener 4, but not as small as the root diameter of mounting fastener 4, so that splines 44 are tapped by mounting fastener 4 to form mating threads 45. Preferably, the height of splines 44 from the interior of wall 38 is selected so that the effective inner diameter of bore 8 is small enough so that the threading of a #6 threaded mounting fastener 4, with an outer diameter of about 0.136 inch, can tap splines 44, and so that the inner diameter of wall 38 is large enough so that the threading of a #8 threaded mounting fastener 4, having an outer diameter of about 0.164 inch, only taps splines 44 and does not tap wall 38. In a preferred embodiment, bore 8 has an inner diameter at wall 38 of between about 0.17 inch and about 0.21 inch, preferably between about 0.18 inch and about 0.2 inch, still more preferably about 0.19 inch, and splines 44 have a height of between about 0.015 inch and about 0.045 inch, preferably between about 0.025 inch and about 0.035 inch, still more preferably about 0.03 inch, so that the effective inner diameter of bore 8 at splines 44 is between about 0.11 inch and about 0.16 inch, preferably between about 0.12 inch and about 0.145 inch, still more preferably about 0.13 inch.

Anchor 10 is made from a material that is strong enough to withstand the torsional forces of driving anchor 10 into drywall 1 and support member 2 under normal conditions, yet malleable enough to be tapped by threaded mounting fastener 4. The material of anchor 10 is preferably pierceable or breakable by mounting fastener 4 so that tip 36 of mounting fastener 4 will be able to extend past drilling tip 16 of anchor 10. Also, anchor 10 should be made from a material that can easily and inexpensively be formed into the specific geometry of anchor 10. Anchor 10 can be made from a metal or metal alloy that can be die cast into the shape of anchor 10, such as tin based alloys, aluminum based alloys, magnesium based alloys, copper, bronze or brass alloys, and zinc based alloys. In one embodiment, anchor 10 is made from a zinc alloy, such as Zamac 1.

Anchor 10 can also be made from plastic or other polymeric materials, e.g. an engineered plastic such as Delron, nylon, and nylon with fillers, such as glass filled nylon. However, anchor 10 should be made to be strong enough to withstand the torsional forces of driving anchor 10 into drywall 1 and support member 2.

Distal Portion

Figure 6:
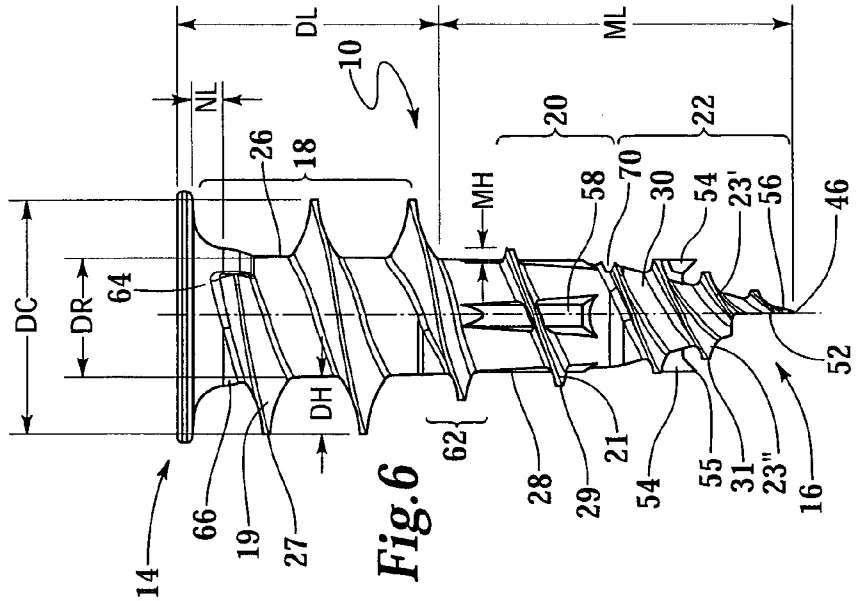
FIG. 6 is a side view of the break-off tip embodiment of the self drilling anchor having an alternative drilling tip.

Turning back to FIGS. 1-4, distal portion 22 allows anchor 10 to drill through drywall 1 and support member 2 as it may be driven manually by a user so that a separate pre-drilling step is not needed. Distal portion 22 includes a drilling tip 16, and in a preferred embodiment, shown in FIG. 2, drilling tip 16 is generally conical in shape and is coaxial with body 12 so that drilling tip 16 comes to point 46 at body axis 6. Preferably, drilling tip 16 includes a sharp point 46 to guidedly and quickly engage surface 48 of drywall 1 and the front surface of support member 2. Drilling tip 16 can also include a flat 52, as shown in FIG. 6, on the lower portion of drilling tip 16 to aid initial engagement of anchor 10 with drywall 1 and with support member 2.

Distal portion 22 includes a threaded exterior having drilling threading 23 disposed on distal portion 22 for engaging drywall 1 and support member 2. Drilling threading 23 includes a root 30 and a crest 31 having a crest diameter TC substantially smaller than drywall gripping threading crest diameter DC, and a thread height TH substantially smaller than drywall gripping thread height DH. Drilling thread height TH is also small enough so that the installation torque into support member 2 may be achieved manually by the typical user so that anchor 10 can be driven into support member 2. Threading 23 can also include a radius of curvature between the base of the thread 23 and root 30, best seen in FIG. 3, to prevent the formation of stress concentrations at base of thread 23.

Continuing with FIGS. 2 and 3, drilling threading root 30 tapers from intermediate portion 20 toward drilling tip 16 so that the cross sectional area of drilling threading root 30 proximate drilling tip 16 is reduced with respect to the cross sectional area at intermediate portion 20. Thread height TH of drilling threading 23 remains substantially constant along the length of distal portion 22. However, because root 30 is relatively small, particularly at drilling tip 16, thread height TH can be larger, for example larger than thread height MH of member gripping threading 21, because the small root 30 allows a larger thread height without an overly large crest diameter TC.

Distal portion threading 23 and intermediate portion threading 21 engage drywall 1 and drive anchor 10 through drywall 1. If anchor 10 is driven into a location wherein a support member 2 is located behind drywall 1, drilling tip 16 hits support member 2, and if support member 2 is relatively hard with respect to drywall 1, e.g. a wood support stud, then anchor 10 typically spins within drywall 1 without axially advancing into support member 10, referred to herein as stalling. As anchor 10 stalls, distal portion threading 23 and intermediate portion threading 21 drill a hole of a predetermined size in drywall 1 while drilling tip 16 drills into support member 2. Eventually drilling tip 16 drills to a depth into support member 2, usually between about ⅛ inch and about ¼ inch, that allows distal portion threading 23 to engage support member 2 and begin pulling anchor 10 through support member 2 and drywall 1 so that drywall gripping threading 19 can engage drywall 1.

It has been found that the size of the hole drilled into drywall 1 by intermediate portion threading 21 is important in the grip created between drywall and drywall gripping threading 19, particularly if anchor 10 is driven into drywall only. It has been found that for drywall threading having a crest diameter of about ½ inch, it is ideal for the hole drilled in the drywall to have a diameter of about ¼ inch. Therefore, distal portion 22 is designed to drill out a hole in drywall 1 that generally maximizes to the extent practically attainable the pullout strength of anchor 10 in drywall 1.

Continuing with FIG. 2, distal portion 22 can include at least one wing 54 that protrudes radially outwardly from distal portion 22 to ream out drywall 1 to form a hole having a predetermined diameter selected to maximize pullout strength in drywall 1, particularly when anchor 10 is driven into drywall 1 only, with no support member 2 behind the installation location. Preferably, wing 54 extends to a distance from axis 6 that is approximately equal to the root radius of proximal portion 18 near flange 40, wherein the root radius is half of the root diameter DR. Wings 54 are designed to break away when they hit support member 2 so that wings 54 do not ream out support member 2, but only ream out drywall 1.

In the embodiment shown in FIG. 2, distal portion 22 includes a pair of wings 54 that protrude radially outwardly from distal portion 22. Wings 54 are evenly spaced around the perimeter of distal portion 22 so each of a pair of wings 54 are about 180° apart. Wings 54 protrude radially outwardly so that a width WW across wings 54 is approximately equal to root diameter DR of proximal portion 18 near flange 40. It is preferred that the hole reamed out by wings 54 be approximately equal to root diameter DR so that wings 54 ream out only as much drywall 1 as is necessary, leaving behind a maximum amount of drywall 1 for engagement with drywall gripping threading 19.

Figure 5:
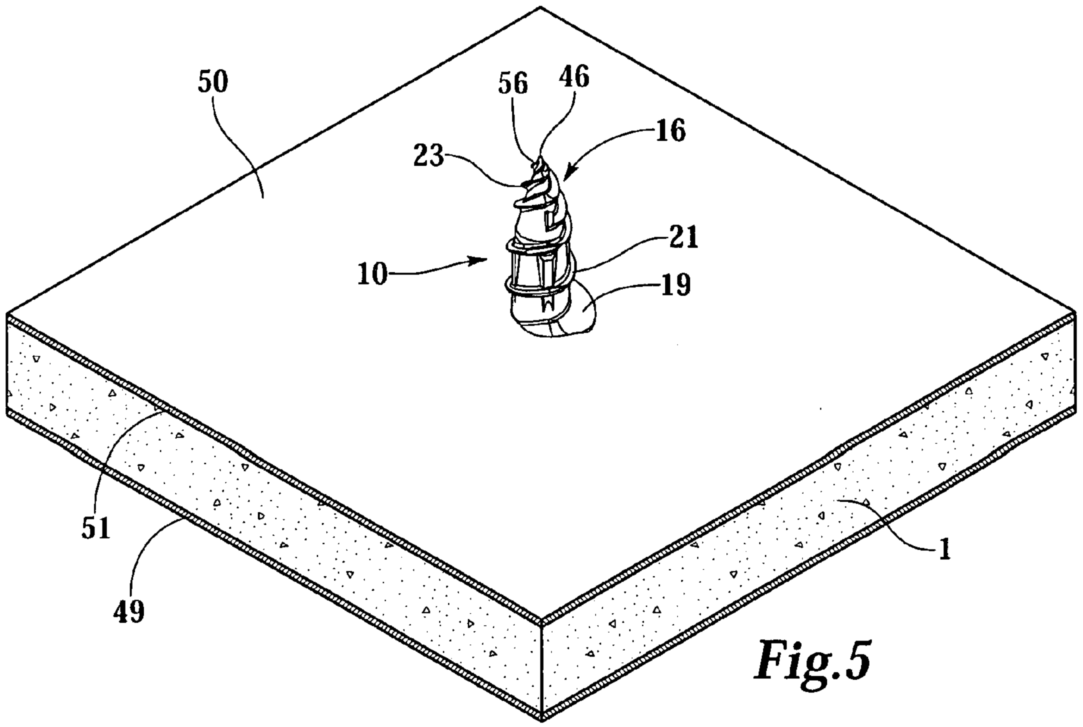
FIG. 5 is a perspective view of the break-off tip embodiment of the self drilling anchor installed in a friable material only, shown from the back side of the friable material.

If drilling tip 16 hits support member 2, there is a momentary stall as drilling tip 16 drills into support member 2, as described above, so that the threading on anchor 10 begins to strip away a portion of drywall 1. For this reason, it is important that drilling threading 23 engage support member 2 and that distal portion 22 drill into support member 2 quickly so that anchor 10 does not excessively strip out drywall 1 before being driven forward, avoiding the creation of scarring on the surface 48 of drywall 1. Drilling threading 23 extends to an axial position that is as close to drilling tip 16 as possible so that drilling threading 23 can more quickly engage with support member 2. In a preferred embodiment, drilling threading 23 extends substantially to said drilling tip 16 so that a lead 56 of drilling threading 23, shown in FIGS. 1, 2, and 5, is axially spaced from drill tip point 46 by between about 0 inches, wherein drilling threading 23 extends substantially all the way to drilling tip 16, and about 0.06 inch. Ideally, it is preferred that drilling threading 23 extends all the way to drilling tip 16, i.e. no space between tip point 46 and lead 56, however, it has been found that for a drilling tip that comes to a point, wherein the root essentially has a diameter of 0 inches, the drilling threading actually becomes axial, which can make it difficult for the drilling threading to engage support member 2. For this reason, lead 56 of drilling threading 23 can be spaced slightly from drilling tip 16, e.g. at about 0.02 inch.

Anchor 10 should have enough structural strength to withstand high torsional forces without collapsing, particularly at drilling tip 16. The potential for anchor 10 to collapse is exacerbated by thin wall 38 described above, which provide little support against the high torsion forces experienced by anchor 10 when driving into support member 2. For this reason, anchor 10, and especially drilling tip 16, includes strengthening elements. Drilling threading 23 provides a structural strengthening effect on drilling tip 16. This structural strengthening is important because of the high torsional forces associated with driving anchor 10 into support member 2, especially since anchor wall 38 is thin and do not provide much structural support by itself.

Continuing with FIGS. 1 and 2, external threading 23 of distal portion 22 can include two generally helical threads 23', 23" arranged in a double helix. The double helix configuration of threads 23', 23" provides added support around distal portion 22 to help prevent distal portion 22 from collapsing due to the torsional forces of driving anchor 10 into support member 2. Double helix threads 23', 23" also provide balanced driving into support member 2 and faster engagement of drilling tip 16 with support member 2. In addition, the double lead threads 23', 23" extend to an axial position proximate to drilling tip 16 so that anchor 10 can quickly engage and drill into support member 2.

Preferably, each thread 23', 23" of the double helix has substantially the same pitch P so that one of the threads 23', 23" does not overtake the other. Preferably, second thread 23" is spaced axially from first thread 23' by approximately half the pitch P of threads 23', 23", i.e. about 0.1 inch for a pitch P of about 0.2 inch, so that at every axial position along distal portion 22, there is a thread 23', 23" on either side providing structural support. Preferably, threads 23', 23" of double helix have substantially the same thread height TH.

First thread 23' of the double helix may continue as a thread 21 on intermediate portion 20 while second thread 23" is only present on distal portion 22. Both threads 23', 23" can also continue on in a double helix on intermediate portion 20 (not shown) to provide structural support for intermediate portion 20 as well as distal portion 22. If second thread 23" is extended onto intermediate portion 20, it provides improved grip with support member 2.

Intermediate Portion

As described above, it is desirable to allow mounting fastener tip 36 to extend past drilling tip 16 of anchor 10 so that a user can use mounting fasteners 4 of different lengths. However, unless anchor 10 adequately grips support member 2 when mounting fastener 4 begins to drive into support member 2, the rotation of mounting fastener 4 will cause mounting fastener threading 5 to back anchor 10 out of drywall 1, known as "jacking," which can cause complete failure of anchor 10 and can cause drywall gripping threading 19 to scar drywall 1. Resistance to jacking is accomplished by a positive engagement between anchor 10 and support member 2 via member gripping threading 21 and drilling threading 23 when mounting fastener 4 is driven into support member 2. If mounting fastener 4 does not pierce or break through anchor 10, the member gripping strength of intermediate portion 20 is not as critical. However, it is still desirable that anchor 10 adequately engage support member 2 because engagement with support member 2 is the main source of the holding value of anchor 10.

Returning to FIGS. 2 and 3, member gripping threading 21 is disposed on intermediate portion 20 and includes a root 28 and a crest 29 having a crest diameter MC substantially smaller than drywall gripping threading crest diameter DC. In the embodiment shown in FIG. 2, root 28 of intermediate portion 20 is generally frustoconical so that root 28 tapers slightly toward distal portion 22 so that the torque required to install anchor 10 will be minimized, particularly in wood support members, because it allows the root diameter MR and crest diameter MC of intermediate portion 20 to be smaller. In one embodiment, member gripping threading root 28 tapers at an angle of between about ½ degree and about 4 degrees, preferably about 2¼ degree.

It is preferred that the largest crest diameter MC of intermediate portion 20 be selected to maximize the gripping between drywall gripping threading 19 and drywall 1, particularly when anchor 10 is to be installed in drywall only. For example, for an anchor 10 have a drywall gripping threading crest diameter DC of about ½ inch, it is desired that the largest member gripping crest diameter MC be about ¼ inch or smaller.

In contrast to drywall gripping threading 19, described below, member gripping threading 21 has a thread height MH that is substantially smaller than the thread height DH of drywall gripping threading 19. The crest diameter MC of intermediate portion 20 is also substantially smaller than the crest diameter DC of proximal portion 18 so that the required installation torque in a support member 2, such as a wood stud, is not excessive. The crest diameter MC and thread height MH of member gripping threading 21 is preferably selected so that it is small enough that it does not scar or tear drywall 1 when anchor 10 stalls when drilling into support member 2, described above, and so that member gripping threading 21 does not engage drywall 1 during stalling, which would jack drywall 1 away from support member 2.

Although larger thread heights MH, TH of intermediate portion 20 and distal portion 22 would result in higher pullout strength within support member 2, it would also greatly increase the torque required to drive anchor 10 into wood or other support member materials, making it difficult for a user to install anchor 10, particularly with a hand-driven screwdriver. Therefore, thread height MH, TH should be chosen to allow for an acceptable torque as intermediate portion 20 is driven into support member 2.

In the embodiment shown in FIG. 1, threading 21 of intermediate portion 20 is one generally helical thread 21 is a continuation of drilling thread 23' and extends on to drywall engaging thread 19 (described below). External threading 21 of intermediate portion 20 can also be a double helix similar to the double helix shown in distal portion 22 to provide added structural support on intermediate portion 20. Intermediate threading 21 can also have a radius of curvature between the base of thread 21 and root 28 to prevent the formation of stress concentration along the base of thread 21.

The combined length ML of intermediate portion 20 and distal portion 22 is preferably larger than the thickness T of drywall 1 so that when anchor 10 stalls before beginning to drill into support member 2, the larger crested threading 19 of proximal portion 18 (described below) is not engaged with drywall 1, which would tend to strip out drywall 1 and leave a large scar on front surface of drywall 1. The length ML should also be long enough so that distal portion 22 completes its drilling of drywall 1 before drywall gripping threading 19 begins to engage drywall 1, particularly when anchor 10 is driven into drywall only. This is preferred because drilling into a material tends axially advance through the material substantially slower than driving through the material with threading. For example, anchor 10 is driven axially through drywall 1 by drywall gripping threading 19 much faster than anchor 10 can drill into drywall 1. If the drilling step is not completed before drywall gripping threading 19 begins to engage drywall 1, than it is likely that drywall gripping threading 19 will strip out drywall 1 rather than drive anchor 10 through it. Additionally, it is important to balance the length ML of intermediate portion 20 and distal portion 22 and the installation torque required to drive anchor 10, particularly into support member 2.

Continuing with the embodiment shown in FIGS. 1 and 2, intermediate portion 20 includes ribs 58 for structural support. Preferably ribs 58 are axially extending and protrude radially outwardly slightly from root 28 of intermediate portion 20. Ribs 58 can also be placed on proximal portion 18 or distal portion 22 to provide more structural support along anchor 10 when drilling and threading into support member 2.

In a preferred embodiment, anchor 10 includes a double helix of drilling threads 23', 23" and axial ribs 58, which cooperate to form a cage or lattice of support around distal portion 22 and intermediate portion 20 to help prevent anchor 10 from collapsing due to the high torsional forces of driving anchor 10 into support member 2. Splines 44 in bore 8, shown in FIG. 3, also add strength to the cage or lattice support structure of anchor 10.

Proximal Portion

Returning to FIGS. 1-4, proximal portion 18 includes a threaded exterior for engagement with drywall I when anchor 10 is installed so that the load of article 3 will be supported by drywall 1, particularly if anchor 10 is driven into drywall only. Drywall gripping threading 19 taps a mating thread 60 in drywall 1 so that an engagement between drywall gripping threading 19 and drywall 1 is accomplished. The threaded exterior includes threading 19 disposed on proximal portion 18 having a crest 27 with a crest diameter DC and a root 26 having a root diameter DR. Drywall gripping threading 19 is high threading wherein the distance between crest 27 and root 26, or the thread height DH, is large relative to member gripping threading 21 and drilling threading 23. High drywall gripping threading 19 helps to maximize the surface area of drywall gripping threading 19 encountered by drywall 1, increasing the pull-out strength. The thread height DH of drywall gripping threading 19 is substantially larger than the thread heights MH, TH of member gripping threading 21 and drilling threading 23, which provides for higher pullout strength in drywall 1. The diameter DC of drywall gripping threading crest 27 can remain essentially the same along the entire length of proximal portion 18. In one embodiment, the diameter DC of crest 27 is about twice the diameter DR of root 26.

Turning to FIG. 5, preferably approximately ¾ of a turn of drywall gripping threading 19 is engaged behind drywall 1 so that drywall engaging threading engages the paper 51 on the rear surface 50 of drywall 1. Engaging paper 51 on drywall rear surface 50 is particularly important when driving anchor 10 into drywall only, because it has been found that engagement with paper 51 provides a substantial portion of the grip between anchor 10 and drywall 1. Drywall gripping threading 19 is not intended to be driven into support member 2 because the high drywall gripping threading 19 would require a very high torque to drive anchor 10 into support member 2.

Returning to FIGS. 2 and 3, root 26 of proximal portion 18 can be tapered toward intermediate portion 20 so that root 26 is generally frustoconical, and so that the diameter of root 26 at the top of proximal portion 18 is larger than the diameter of root 26 at the bottom of proximal portion 18. In the embodiment shown in FIG. 2, tapered root 26 of proximal portion 18 and tapered root 28 of intermediate portion 20 are generally continuous and taper at approximately the same angle so that roots 26, 28 lie generally along the same frustocone giving anchor 10 a ballistic or bullet type shape.

In the embodiment shown in FIG. 1, exterior threading 19 of proximal portion 18 is one thread 19 that is a continuation of member gripping thread 21, except that drywall gripping threading 19 has a substantially larger crest diameter DC and a substantially larger thread height DH than the crest diameter MD and thread height MH of intermediate portion 20, see FIGS. 2 and 3. In one embodiment, crest diameter DC of proximal portion 18 is about twice the crest diameter MC of intermediate portion 20.

Preferably, there is a transition zone 62 between intermediate portion 20 and proximal portion 18 wherein the crest diameter and thread height enlarge from member gripping thread 21 to drywall gripping thread 19. In one embodiment, transition zone 62 extends for about ¾ of a thread turn. Drywall gripping threading 19 is preferably generally helical, as shown in FIG. 1. Drywall gripping threading 19 can also be a double helix of two threads, as described above, wherein one of the threads of the double helix can be a fine thread having a substantially smaller thread height than the thread height DH of drywall gripping thread 19. This second thread would provide added strength to anchor 10. Drywall gripping thread 19 can also include a radius of curvature between the base of the thread 19 and root 26 to minimize stress concentration at the base of drywall thread 19.

Figure 4:
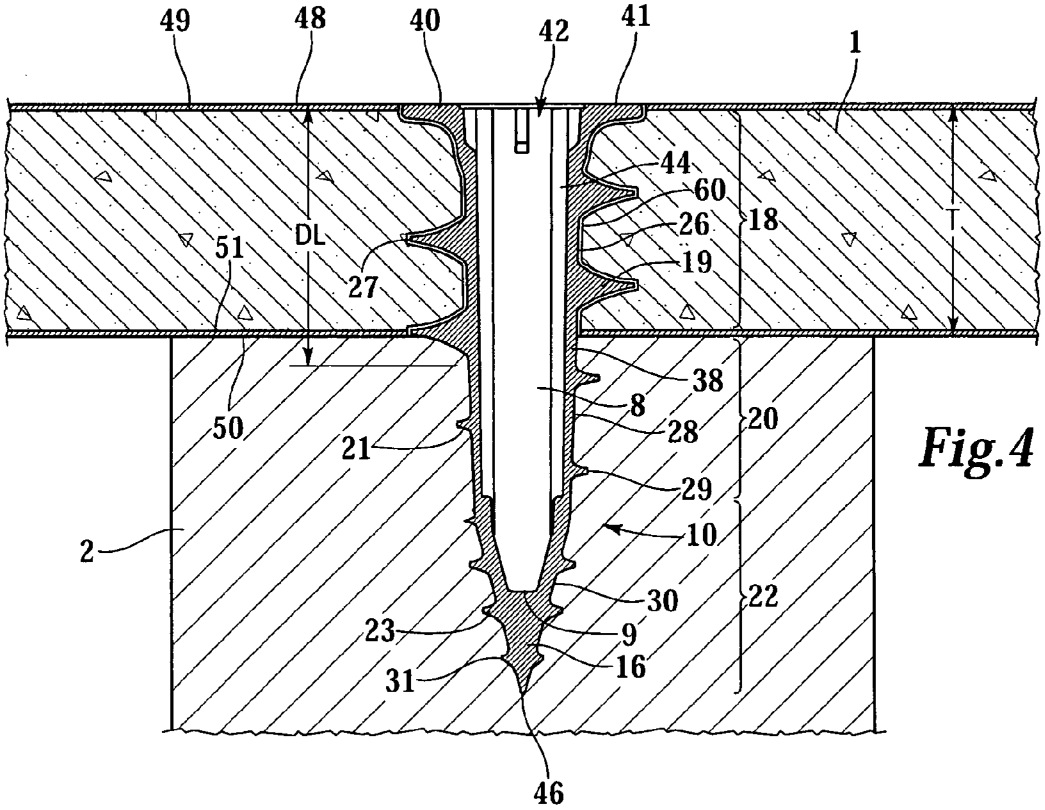
FIG. 4 is a side-sectional view of the break-off tip embodiment of the self drilling anchor installed in a friable material and a support member.

Turning back to FIGS. 2 and 4, the upper end of drywall gripping threading 19 is spaced from flange 40 to form a neck 64 between flange 40 and drywall gripping threading 19. Neck 64 allows upper surface 41 of flange 40 to seat at or below the level of drywall surface 48, as shown in FIG. 4, because the discontinuation of drywall gripping threading 19 at neck 64 before reaching flange 40 creates a space in the threads 60 formed in drywall 1 which allows compression of adjacent material by flange 40. Also, neck 64 ensures that drywall gripping threading 19 is spaced away from paper 49 on drywall surface 48, so that drywall gripping threading 19 does not engage the paper 49 and twist it, creating an undesirable appearance of drywall surface 48. Neck 64 can have a length NL of between about 0.03 inch and about 0.1 inch, preferably about 0.07 inch.

The length DL of proximal portion 18, including flange 40, is preferably slightly larger than the thickness T of drywall 1, as shown in FIG. 4, preferably so that there is a portion of drywall gripping threading 19 behind drywall rear surface 50 to engage rear surface paper 51. It is important to select the length DL of proximal portion 18 carefully, balancing the length of drywall gripping threading 19 engaging paper 51 on rear surface 50 of drywall 1 with the torque required to drive that length of drywall gripping threading 19 into a support member 2, if anchor 10 is driven into a location where a support member 2 is located. In addition, it is desirable that anchor 10 be usable with different thicknesses of drywall 1, so it is important to remember that a certain length DL of proximal portion 18 may allow threading 19 to engage rear surface paper 51 in one thickness of drywall, but may be too short to engage rear surface paper 51 in a thicker drywall, or conversely, proximal portion 18 may be too long so that too much of drywall gripping threading 19 must be driven into a support member for a thinner drywall, resulting in a higher required installation torque.

The pitch P of drywall gripping threading 19 is chosen so that there preferably is at least one full turn of drywall gripping threading 19 in drywall 1, and preferably between about 1¾ turns and about 2¼ turns, still more preferably about 2 full turns of drywall gripping threading 19 embedded in drywall 1. In one embodiment, for drywall 1 having a thickness of ½ inch or ⅝ inch, the pitch P of drywall gripping threading 19 is between about ⅛ inch and about 0.3 inch, preferably about 0.2 inch. Preferably, the pitch of drywall gripping thread 19 is generally equal to the pitches of member gripping threading 21 and drilling thread 23. In one embodiment (not shown) the pitch of drywall gripping threading 19 proximate transition zone 62 has a larger pitch than the remaining thread 19 proximate flared end 14. When this larger pitched threading engages drywall 1, it pulls anchor 10 into drywall relatively fast, helping to counteract any jacking that may tend to occur.

Flared End

Turning to FIGS. 1-4, flange 40 is located at flared end 14 of anchor 10 and includes an enlarged diameter FD with respect to drywall gripping threading root 26 to allow flange 40 to grip paper 49 on drywall front surface 48. In one embodiment, flange 40 has a flange diameter FD of between about 0.45 inch and about 0.6 inch, preferably about 0.515 inch. Flange 40 also includes torque transmitting surfaces 15 so that anchor 10 can be rotated with a driver by the user. Flange 40 can include a recess 42 for receiving the tip of a driver 43, see FIG. 8, wherein recess 42 is configured for a particular kind of driver. In Recess 42 is a Phillips-type recess for receiving the tip of a Phillips-type driver.

Recess 42 has an effective diameter that is larger than the inner diameter of bore 8 to accommodate driver 43 so that anchor wall 38 is thinner at recess 42 than at other axial positions along anchor 10. Because all the torque that is experienced by anchor 10 tends to be concentrated at recess 42, flared end 14 can break off before anchor 10 has been fully driven, particularly if anchor 10 is being driven into a support member 2 because of the high torques required to drive anchor 10 into support member 2. In one embodiment, shown in FIG. 3, anchor 10 includes a widened wall 39 at recess 42 to form a hump 66 for reinforcing recess 42. Widened wall 39 of hump 66 extends along the entire axial length of recess 42 to fully support recess 42 during driving of anchor 10.

The hardness and density of wood in a wood support member 2 can be highly variable. The variation in hardness and density results in a variation in the installation torque required to seat flange 40 within drywall 1 so that trailing surface 41 of flange 40 is flush or below drywall surface 48. Further, the torque required to drive anchor 10 increases significantly when seating flange 40 in drywall compared to merely driving anchor 10 through drywall 1 and support member 2. In some cases, the seating torque increase is high enough that a user must apply such a large torque that the user tends to provide too much torque, and instead of merely seating flange 40, the user over-rotates anchor 10 and strips out some of drywall 1. When the required installation torque becomes too high (i.e. larger than 50 in-lbs), it may become difficult or impossible to seat flange 40 with normal hand tools.

To counteract this seating problem, flange 40 of anchor 10 can be modified to reduce the torque load required for the user to provide. In one embodiment (not shown), anchor 10 does not include a flange, or includes a flange having a diameter that is smaller than the crest diameter DC of drywall gripping threading 19, so that the required seating torque is substantially reduced. This makes it easier for the user to seat the flange, or the trailing end of anchor 10, and reduces the likelihood of over-rotation because the torque ramp up is significantly reduced or eliminated.

Break-Off Flange

Figure 8:
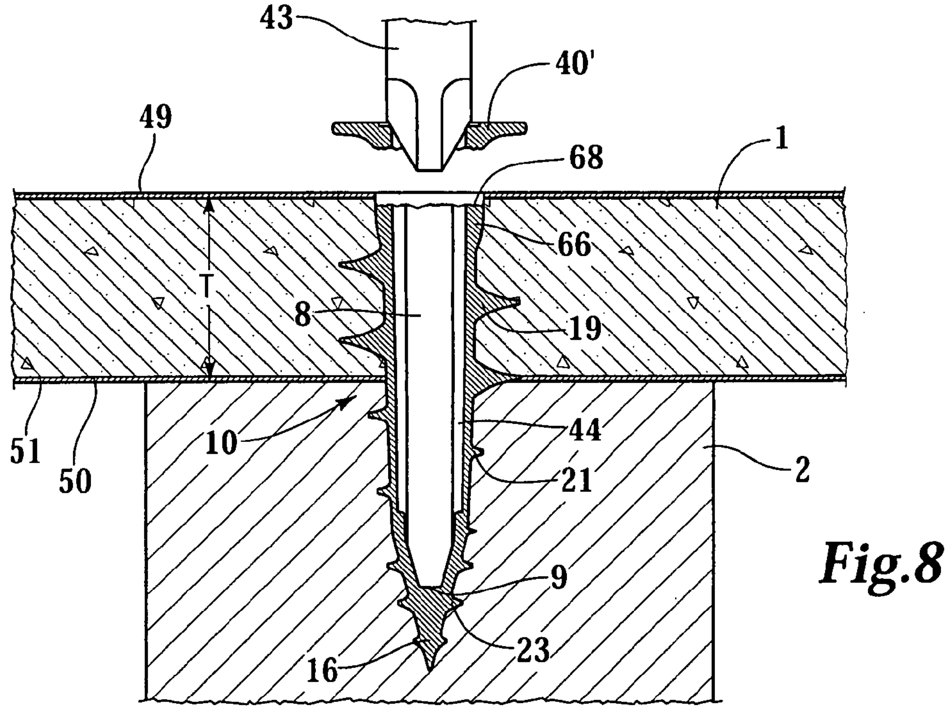
FIG. 8 is a side-sectional view of a break-off flange embodiment of the self drilling anchor.

Anchor 10 may include a break off flange 40', shown in FIG. 8. Anchor 10 includes a break off zone 68 of weakening elements, such as scoring, notches, slits, or small holes to cause flange 40' to break off at a predetermined torque so that once driver 43 applies the predetermined torque to anchor 10, flange 40' breaks off from anchor body 12 so that the user does not have to seat flange 40'. Break off zone 68 is located at an axial position on anchor 10 so that when flange 40' breaks off, the remaining unbroken part of anchor body 12 is at or below the level of drywall surface 48, so that anchor 10 is still functional and able to receive mounting fastener 4. The predetermined break-off torque of flange 40' should be a predetermined amount more than the torque normally required to drive anchor 10 substantially its full length into drywall 1 and support member 2, so that upon breaking off of flange 40', the remaining outermost portion of anchor 10 should be flush or slightly countersunk with respect to drywall surface 48, thereby providing for a nice finished appearance with or without further finishing, depending on the application.

Many of the features of the anchor of the present invention have been described above. As examples of the present invention, several embodiments are discussed below.

Break-Off Tip Embodiment

Referring to FIGS. 1-4, and 7, one embodiment of anchor 10 includes at least one of intermediate portion 20 and distal portion 22 being frangible so that mounting fastener 4 can break off a portion 16' of body 12, see FIG. 7, so that mounting fastener tip 36 can extend beyond the original position of drilling tip 16 (see FIG. 4).

The break-off tip embodiment of anchor 10 is designed so that when a mounting fastener 4 that is longer than anchor 10 is used, mounting fastener tip 36 will break off, or break through, drilling tip 16 of anchor 10 so that mounting fastener tip 36 will be able to extend farther than anchor body 12, as shown in FIG. 7, so that the user of anchor 10 and mounting fastener 4 can use an extra long mounting fastener 4 for varying thicknesses of articles 3 without having to worry if anchor 10 is long enough to support mounting fastener 4. Alternatively, a shorter mounting fastener 4 can be used so that mounting fastener tip 36 does not pierce through anchor body 12, but rather remains retained within bore 8.

Turning to FIGS. 4 and 7, after anchor 10 is installed, mounting fastener 4 is driven into bore 8 until mounting fastener tip 36 bears against the end 9 of interior bore 8, which is located radially within distal portion 22. As the user continues to drive mounting fastener 4, the bearing force on distal portion 22 becomes large enough to break off a portion of distal portion 22 from the rest of anchor body 12. In the embodiment shown in FIG. 7, drilling tip 16' breaks off around the perimeter of distal portion 22 and remains engaged with mounting fastener 4 so that drilling tip 16' is forced deeper into support member by mounting fastener 4.

Continuing with the embodiment in FIGS. 1–3, distal portion 22 includes a weakening element in the structure of anchor body 12 to help ensure that drilling tip 16 breaks off at a desired location. An example of a weakening element is a break in thread 23, such as a longitudinal or lateral notch 70, at the desired axial break off location. Because threading 23 provides structural support, notch 70 in thread 23 provides a small area of structural weakness in anchor body 12 that cannot withstand the tensile forces created by mounting fastener 4 bearing against bore end 9. Notch 70 also helps to prevent threading 23 from unwinding around mounting fastener 4, which helps keep anchor 10 from being unscrewed from drywall 1 if mounting fastener 4 is removed from anchor 10. In one embodiment, notch 70 has a width that is about 0.17 inch, and a shallow depth into the thread of about 0.03 inch.

Turning to FIG. 3, another weakening element includes creating a sharp step 72 in the diameter of bore 8 at the desired axial break off location. Step 72 allows a concentration of stress to form, which increases the likelihood that drilling tip 16 will break off at step 72. Other weakening elements include grooves or small holes (not shown) in anchor body 12 at the desired break off location of drilling tip 16, such as an internal groove within the generally conical area at bore end 9.

Figure 9:
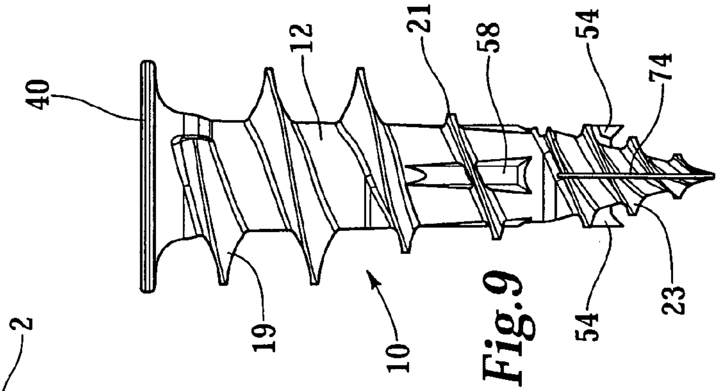
FIG. 9 is a side view of a split tip embodiment of the self drilling anchor.
Figure 10:
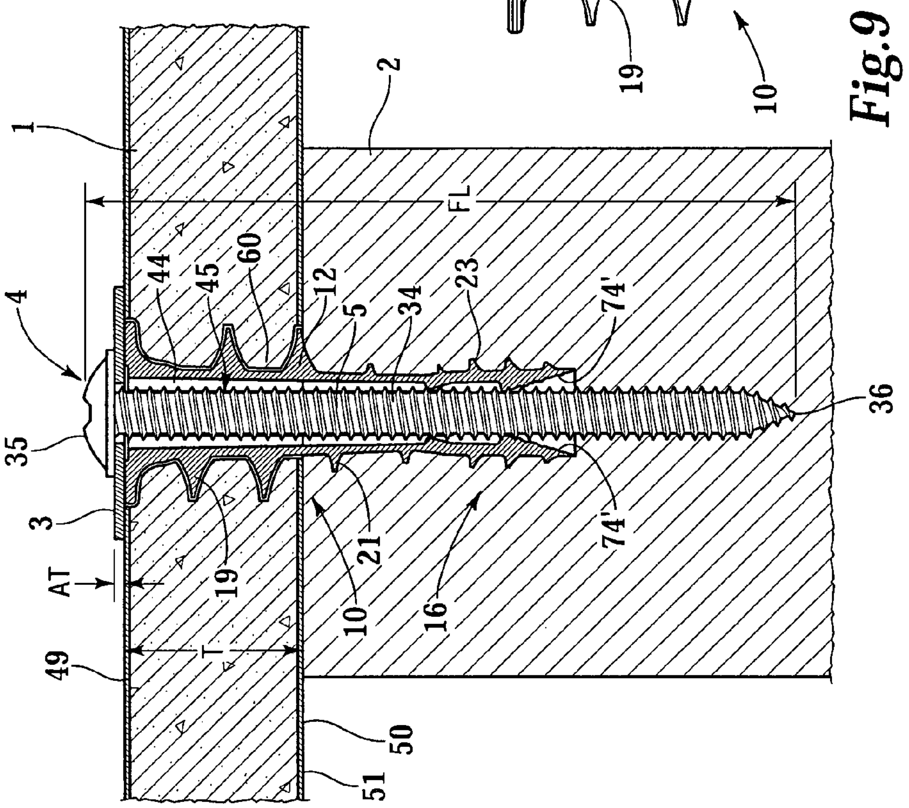
FIG. 10 is a side-sectional view of the split tip embodiment of the self drilling anchor with a mounting fastener inserted through the anchor.

In a split tip embodiment, shown in FIGS. 9 and 10, distal portion 22 includes regions of weakness, such as a set of evenly spaced axially extending slits 74, extending axially toward drilling tip 16. The regions of weakness provided a weakening in wall 38 of distal portion 22, allowing mounting fastener 4 to split distal portion 22 generally along slits 74' as mounting fastener tip 36 bears against bore end 9, so that drilling tip 16 is pushed radially outwardly by mounting fastener 4, as shown in FIG. 10. The split portions of drilling tip 16 remain attached anchor body 12 and distal portion threading 23 remains engaged with support member 2 to provide a stronger grip between anchor 10 and support member 2.

Turning back to FIGS. 2 and 3, the break-off tip embodiment of anchor 10 includes a pair of wings 54 protruding from distal portion 22. Each wing 54 is connected to distal portion 22 so that a portion of each wing 54 is connected to a thread 23', 23", and a portion of each wing 54 is mounted to drilling threading root 30. Wings 54 of anchor 10 protrude radially outwardly, but also extend axially downward slightly and include points 55, which point in generally the same direction as drill point 46, for scoring drywall paper 49 to avoid tearing of paper 49. In one embodiment, wings 54 protrude radially outwardly from distal portion 22 to a distance from axis 6 of between about 0.1 inch and about 0.14 inch, preferably about 0.11 inch, and wings 54 have an axial length of between about 0.06 inch and about 0.09 inch. In one embodiment, a pair of wings 54 has a width WW across the pair of wings 54 of between about 0.2 inch and about 0.28 inch, preferably about 0.22 inch.

Most drywall 1 currently in use is either ½ inch or ⅝ inch thick, therefore it is preferred that the length DL of proximal portion 18, including flange 40, be between about 7/16 inch and about ¾ inch, preferably between about ½ inch and about 11/16 inch, still more preferably about ⅝ inch. The length DL of proximal portion 18 and flange 40 is approximately equal to the length ML of intermediate portion 20 and distal portion 22.

In one embodiment, proximal portion 18 has a crest diameter DC of between about 0.45 inch and about 0.525 inch, preferably about 0.48 inch, a root diameter DR near flange 40 of between about 0.24 inch and about 0.3 inch, preferably about ¼ inch, a thread height TH of between about 0.075 inch and about 0.14 inch, preferably about ⅛ inch, and root 26 of proximal portion 18 tapers toward intermediate portion 20 at an angle with respect to axis 6 of between about ½ degree and about 3 degrees, preferably about 1 degree on each side of proximal portion 18.

Intermediate portion 20 of anchor 10 can have a crest diameter MC near proximal portion 18 of between about 0.26 inch and about 0.35 inch, preferably about 0.28 inch, a root diameter MR near proximal portion 18 of between about 0.2 inch and about ¼ inch, preferably about 0.22 inch, a thread height MH of between about 0.01 inch and about 0.075 inch, preferably about 0.035 inch, and root 28 of intermediate portion 20 tapers toward distal portion 22 at an angle with respect to axis 6 of between about 1 degree and about 4 degrees, preferably about 2¼ degrees. In one embodiment, shown in FIG. 2, the angle which proximal portion root 26 tapers is substantially equal to the angle which intermediate portion root 28 tapers.

Distal portion 22 of anchor 10 can have a maximum crest diameter TC of between about 0.23 inch and about 0.26 inch, preferably about 0.24 inch, a maximum root diameter TR of between about 0.18 inch and about 0.22 inch, preferably about 0.2 inch, a thread height TH of between about 0.02 inch and about 0.07 inch, preferably about 0.035 inch, and drilling threading root 30 tapers toward drilling tip 16 at an angle with respect to axis 6 of between about 10 degrees and about 20 degrees, preferably about 15 degrees. The total length ML of intermediate portion 20 and distal portion 22 can be between about ½ inch and about ⅞ inch, preferably about ⅝ inch.

Anchor 10 includes axially extending supporting ribs 58 mounted to member gripping threading root 28. In one embodiment, ribs 58 protrude radially outwardly from root 28 more at the driving end than at the trailing end of ribs 58, as shown in FIG. 2. In one embodiment, ribs 58 have a length RL of between about 0.2 inch and about 0.36 inch, preferably about 0.28 inch and a width RW of between about 0.04 inch and about 0.1 inch, preferably about 0.08 inch, and ribs 58 protrude from root 28 by about 0.015 inch.

Can-Opener Embodiment

Figure 11:
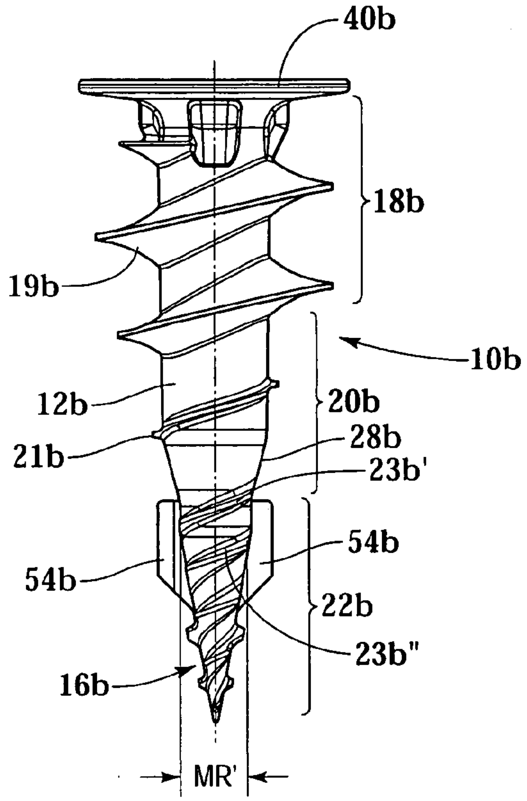
FIG. 11 is a side view of a can-opener embodiment of the self drilling anchor.
Figure 12:
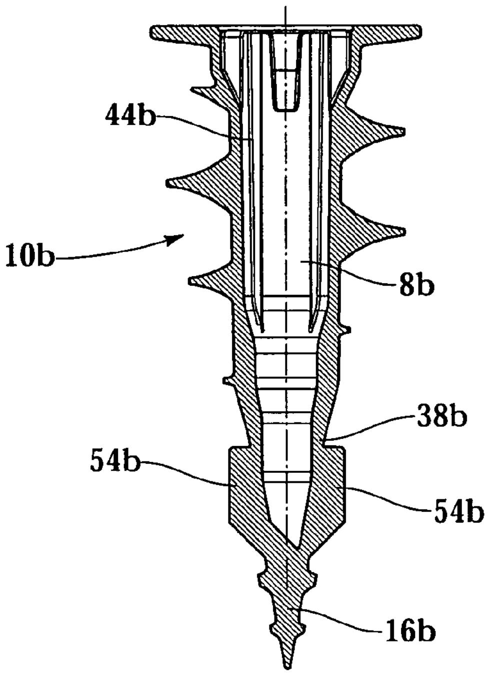
FIG. 12 is a side-sectional view of the can-opener embodiment of the self drilling anchor.
Figure 14:
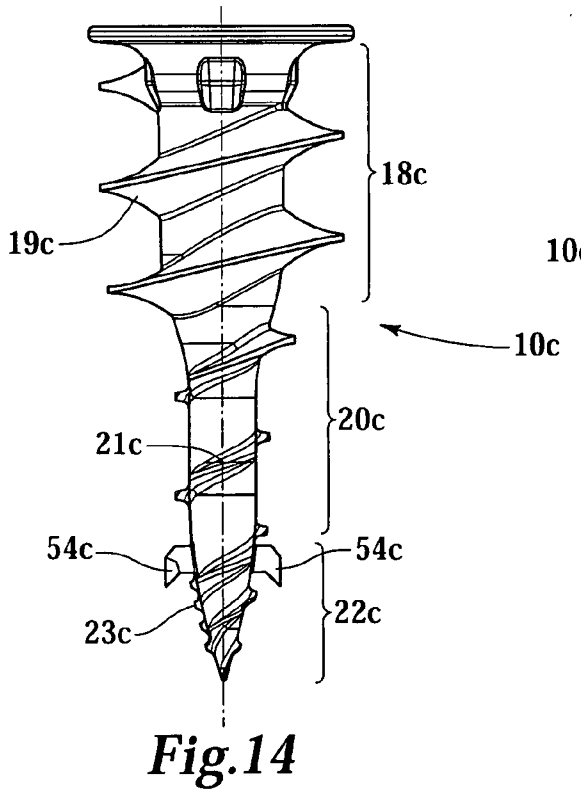
FIG. 14 is a side view of a tip bypass embodiment of the self drilling anchor.
Figure 13:
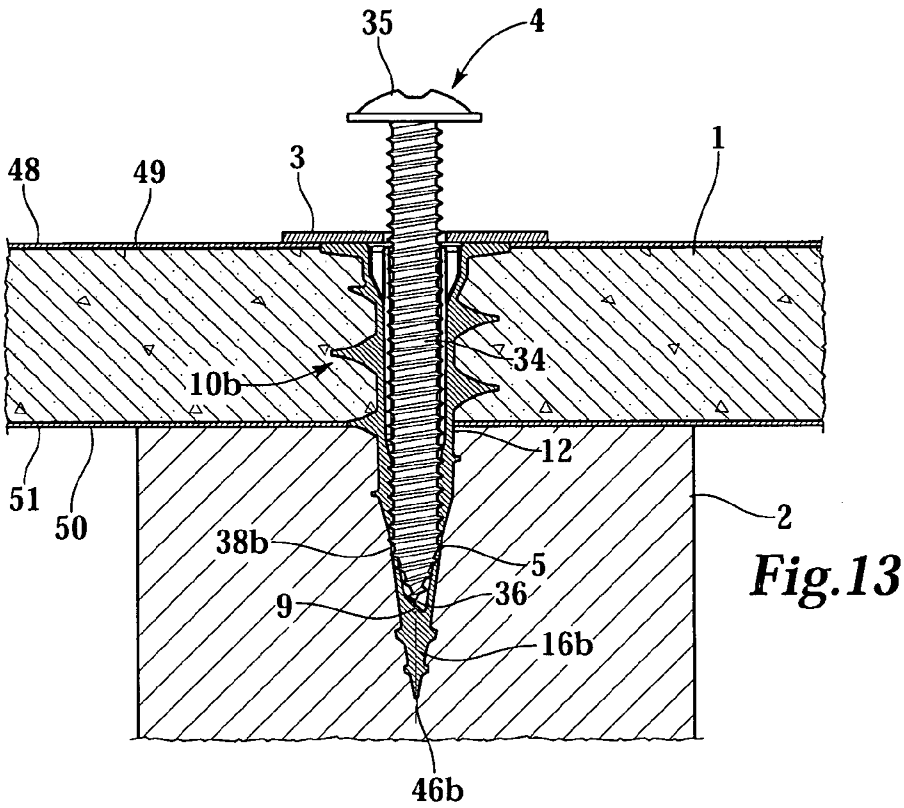
FIG. 13 is a side-sectional view of the can-opener embodiment of the self drilling anchor installed with a mounting fastener inserted into the self drilling anchor.

Turning to FIGS. 11–13, a can-opener embodiment of anchor **10*b* is shown wherein the outer diameter of at least one of intermediate portion 20*b* and distal portion 22*b* is smaller than the crest diameter, or outer diameter, of mounting fastener 4, so that mounting fastener threads 5 can penetrate through the at least one of intermediate portion 20 and distal portion 22 so that mounting fastener tip 36 can extend beyond the original position of drilling tip 16***b*. Wall 38*b* between bore 8 and the exterior of distal portion 22*b* or intermediate portion 20*b* near distal portion 22*b* is thin enough, and is close enough to axis 6, that mounting fastener threading 5 is able to slice through wall 38*b*, as shown in FIG. 13, shearing around the perimeter of anchor body 12*b* so that drilling tip 16*b* is no longer connected to the rest of anchor body 12*b*. Drilling tip 16*b* becomes separated from the remainder of anchor body 12*b* and remains engaged with mounting fastener tip 36, similar to tip 16' shown in FIG. 7.

Because wall 38*b* is positioned closer to axis 6 to allow mounting fastener threading 5 to slice through wall 38*b*, the corresponding root diameter MR' of intermediate portion 20*b* is also smaller, which requires a smaller torque to install fastener, and which requires less material to manufacture.

Anchor 10*b* can also have a set of wings 54*b* similar to wings 54 of anchor 10 of the break-off tip embodiment. In one embodiment, wings 54*b* extend axially, but do not have points to score the surface of drywall 1.

Proximal portion 18*b* of the can-opener embodiment of anchor 10*b* has approximately the same dimensions as those for the break-off tip embodiment of anchor 10, described above. Intermediate portion 20*b* of anchor 10*b* is slightly different than intermediate portion 20 of anchor 10, shown in FIG. 2. A portion of intermediate portion root 28*b* tapers toward distal portion 22*b* at an angle that is noticeably larger than the angle which proximal portion root 26*b* tapers so that so that member gripping threading root 28*b* becomes smaller than member gripping threading root 28 of the break-off tip embodiment. The smaller root of member gripping threading root 28*b* allows mounting fastener threading 5 to slice through wall 38*b*, cutting off a portion of drilling tip 16*b* from the rest of anchor body 12*b*. In one embodiment, intermediate portion 20 has a root diameter MR' that is between about 0.16 inch and about 0.22 inch, preferably about 0.2 inch. Distal portion 22*b* of anchor 10*b* also has a maximum root diameter and crest diameter that is smaller than those of anchor 10 of the break-off tip embodiment.

Tip Bypass Embodiment

Turning to FIGS. 14-18, in another embodiment of anchor 10*c*, at least one of intermediate portion 20*c* and 22*c* is penetrable by mounting fastener tip 36 so that mounting fastener tip 36 can bypass drilling tip 16*c*. In the embodiment shown in FIG. 15, bore 8*c* does not extend substantially into intermediate portion 20*c* so that substantially all of intermediate portion 20*c* and distal portion 22*c* are solid, best seen in FIG. 15. With little or no bore 8*c* in intermediate portion 20*c* and distal portion 22*c*, these portions can have a smaller diameter which makes anchor 10*c* easier to drive into drywall 1 and support member 2 because less torque is required, and allows anchor 10*c* to be driven into drywall 1 and support member 2 faster. In addition, the solid intermediate portion 20*c* and distal portion 22*c* also are structurally stronger. In one embodiment, intermediate portion 20*c* has a crest diameter MC" of between about 0.18 inch and about 0.22 inch, preferably about 0.2 inch, compared to the crest diameters described above for the break-off tip embodiment and the can-opener embodiment of anchor 10, 10*b*.

Figure 17:
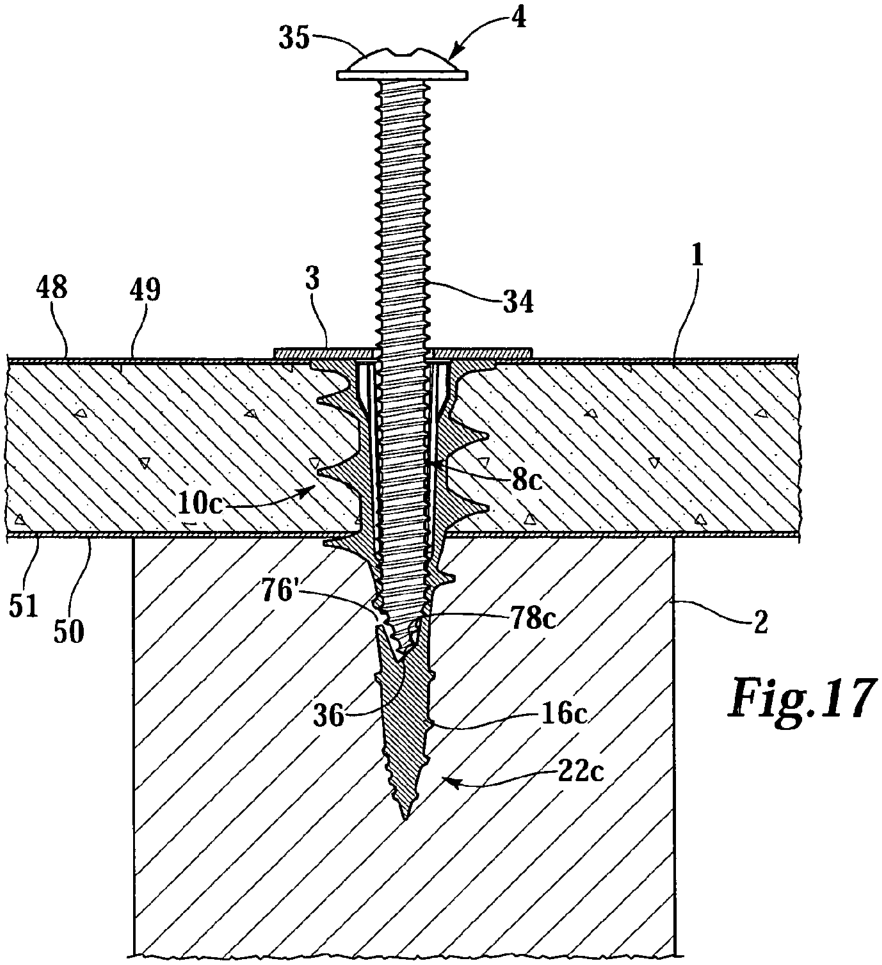
FIG. 17 is a side-sectional view of the tip bypass embodiment of the self drilling anchor with a mounting fastener beginning to pierce the anchor.
Figure 18:
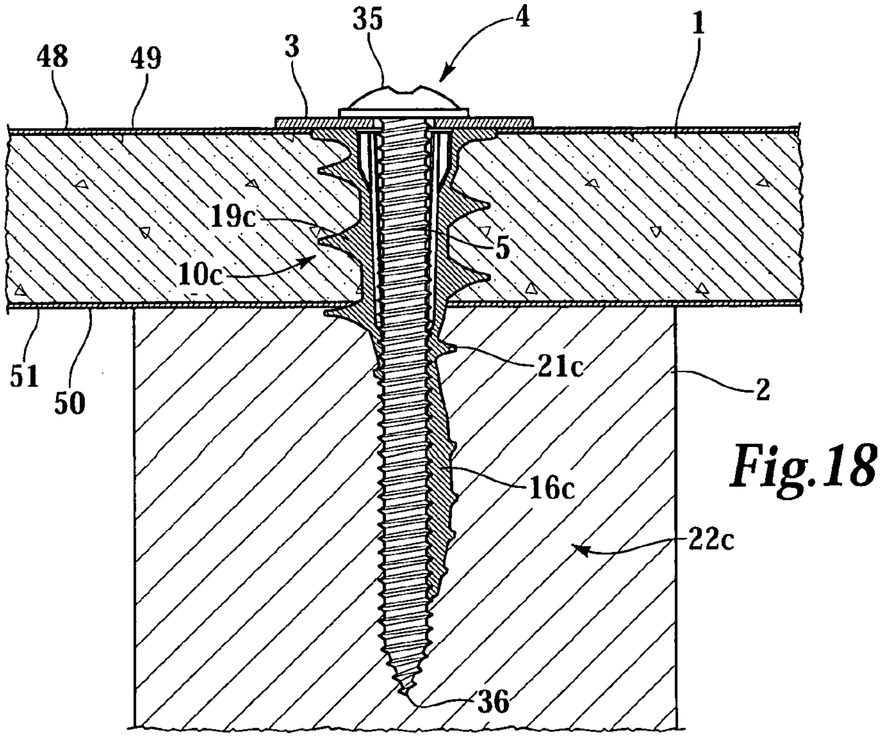
FIG. 18 is a side-section view of the tip bypass embodiment of the self drilling anchor with the mounting fastener bypassing the drilling tip.

Bore 8*c* of anchor 10*c* is designed to cause mounting fastener 4 to cut and push through a thin region 76 of sidewall 38*c*. Mounting fastener 4 then pushes intermediate portion 20*c* and drilling tip 16*c* to the side as mounting fastener 4 passes, as shown in FIGS. 17-18. Intermediate portion 20*c* is designed to remain attached to anchor body 12*c* in order to be pushed aside by mounting fastener 4*c*, so that it remains engaged with support member 2, providing resistance to pullout and jacking of anchor 10*c*.

Figure 15:
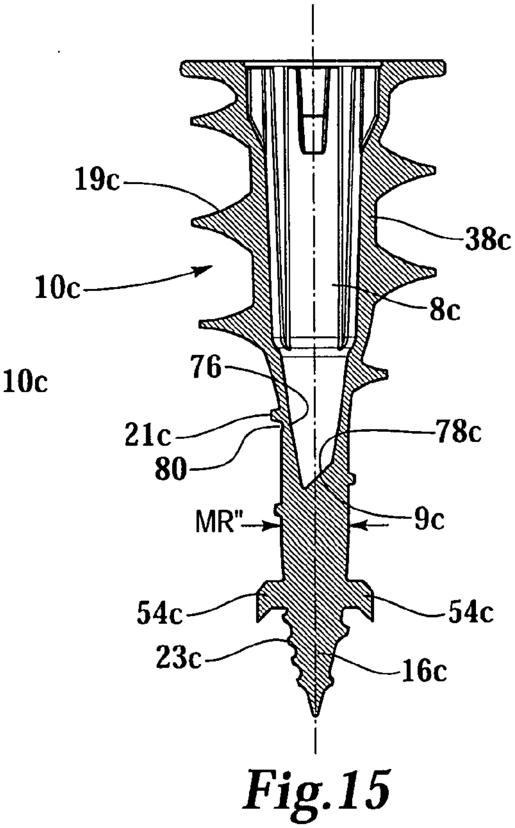
FIG. 15 is a side-sectional view of the tip bypass embodiment of the self drilling anchor.

In the embodiment shown in FIG. 15, bore 8*c* includes a bearing surface 78*c* at bore end 9*c* angled toward thin region 76. As mounting fastener 4 is driven, its tip 36 bears against angled bearing surface 78*c*, creating a camming action that cams intermediate portion 20*c* and distal portion 22*c* aside.

Figure 16:
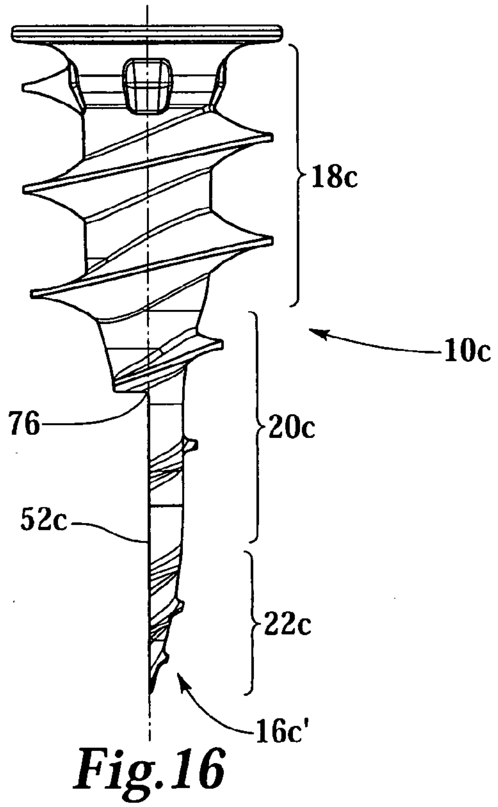
FIG. 16 is a side view of the tip bypass embodiment of the self drilling anchor having an alternative drilling tip.

Continuing with FIG. 16, thin region 76 can be achieved with a flat 52*c* that extends through intermediate portion 20. There can also be a notch 80 in intermediate portion 20 near the location where intermediate portion 20 meets proximal portion 18. Notch 80 aids the pivoting or camming action of intermediate portion 20 as it is pushed aside by mounting fastener 4.

Open Tip Embodiment

Figure 19:
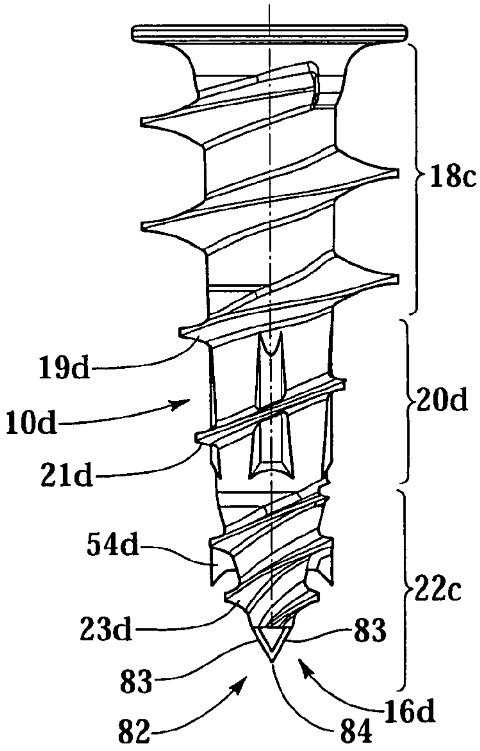
FIG. 19 is a side view of an open tip embodiment of the self drilling anchor.

In an open tip embodiment of anchor 10*d*, shown in FIG. 19, distal portion 22*d* does not have a drilling point, but rather has an open drilling tip 16*d*. Open drilling tip 16d allows mounting fastener 4 to be driven so that mounting fastener tip 36 can extend through open drilling tip 16*d* without having to pierce through or break off part of anchor 10*d*, while open ended anchor 10*d* still grips support member 2.

Anchor 10*d* is similar to anchor 10 of the break-off tip embodiment, except with a portion of the drilling tip removed at a predetermined axial distance from the drilling point. It is preferred that the inner diameter of bore 8*d*, which extends all the way to drilling tip 16*d*, be larger than the root diameter of threaded mounting fastener 4, and preferably approximately equal to or slightly larger than the crest diameter of threaded mounting fastener 4 so that mounting fastener 4 does not have to excessively pierce through drilling tip 16*d*.

Preferably, open drilling tip 16*d* includes a centering element 82, see FIG. 19, which can be engaged with drywall 1 at the initiation of drilling 1 to ensure that anchor 10*d* is drilled into drywall 1 at the desired position. Centering element 82 may include a set of thin legs 83 which meet at a point 84. Thin legs 83 have enough structural integrity to be able to initially drill through drywall 1, but eventually legs 83 may collapse due to the force of driving anchor 10*d* into drywall 1 and support member 2.

Method of Installation

The method by which a user installs an anchor 10 and an elongated mounting fastener 4 in drywall 1 mounted on a member comprises the steps of providing an elongated anchor 10 having an axis 6, an axial bore 8 adapted to receive an elongated mounting fastener 4, a flared end 14 having torque transmitting surfaces 15 therein, a drilling tip 16 generally opposite flared end 14, a proximal portion 18 proximate flared end 14, an intermediate portion 20, and a distal portion 22 extending to drilling tip 16, wherein proximal portion 18 has a threaded exterior, such as drywall gripping threading 19, having a root 26, a crest 27 with a crest diameter DC, and a thread height DH, intermediate portion 20 has a threaded exterior, such as member gripping threading 21, having a root 28, a crest 29 with a crest diameter MC substantially smaller than drywall gripping threading crest diameter DC, and a thread height MH substantially smaller than drywall gripping thread height DH, and distal portion 22 has a threaded exterior, such as drilling threading 23, having a root 30 that tapers toward drilling tip 16, a crest 31 with a crest diameter TC substantially smaller than drywall gripping threading crest diameter DC, and a thread height TH substantially smaller than drywall gripping thread height DH, positioning drilling tip 16 on drywall surface 48, driving anchor 10 into drywall 1 so that distal portion 22 drills through drywall 1 and into support member 2, and drywall gripping threading 19 engages drywall, and inserting elongated mounting fastener 4 into axial bore 8 of anchor 10.

In one embodiment, the method of installation can further include the steps of extending mounting fastener tip 36 beyond the original position of drilling tip 16, piercing at least one of intermediate portion 20 or distal portion 22 with elongated mounting fastener 4, such as by cutting through wall **38*b* at intermediate portion 20*b* with mounting fastener threading 5, as shown in FIG. 13, or piercing through side wall 38*c* of intermediate portion 20*c* or drilling tip 16*c* with mounting fastener tip 36, as shown in FIGS. 17–18, breaking off a portion of anchor 10, such as drilling tip 16' with mounting fastener 4, as shown in FIG. 7, engaging mounting fastener 4 with support member 2, and mounting an article 3 onto mounting fastener 4, as shown in FIGS. 7, 10, 13, and 18**.

Method of Making

Figure 20:
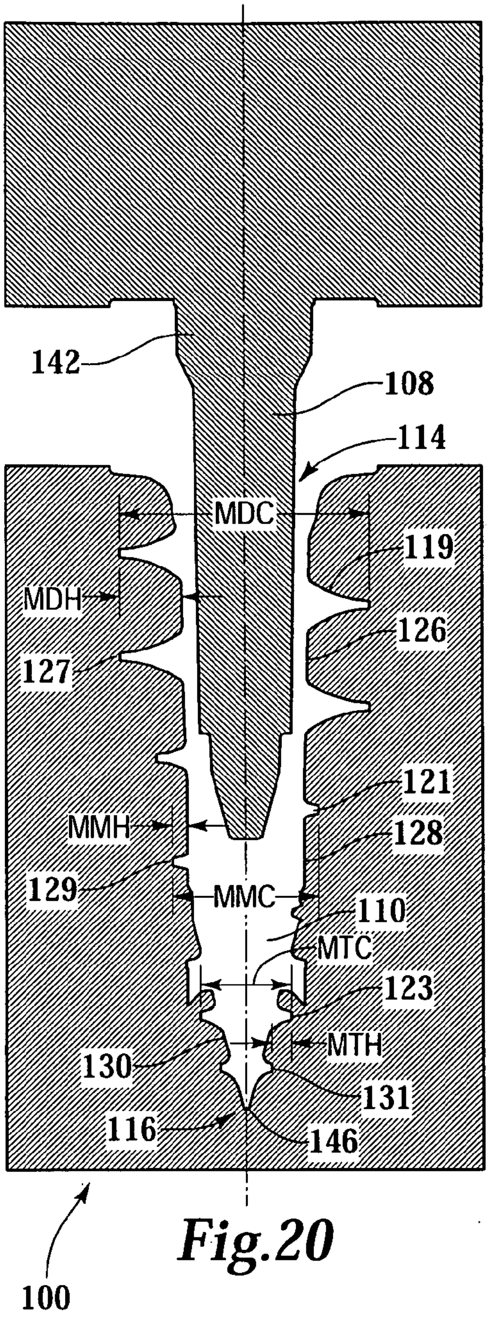
FIG. 20 is a side-sectional view of an open mold for forming the self drilling anchor.
Figure 21:
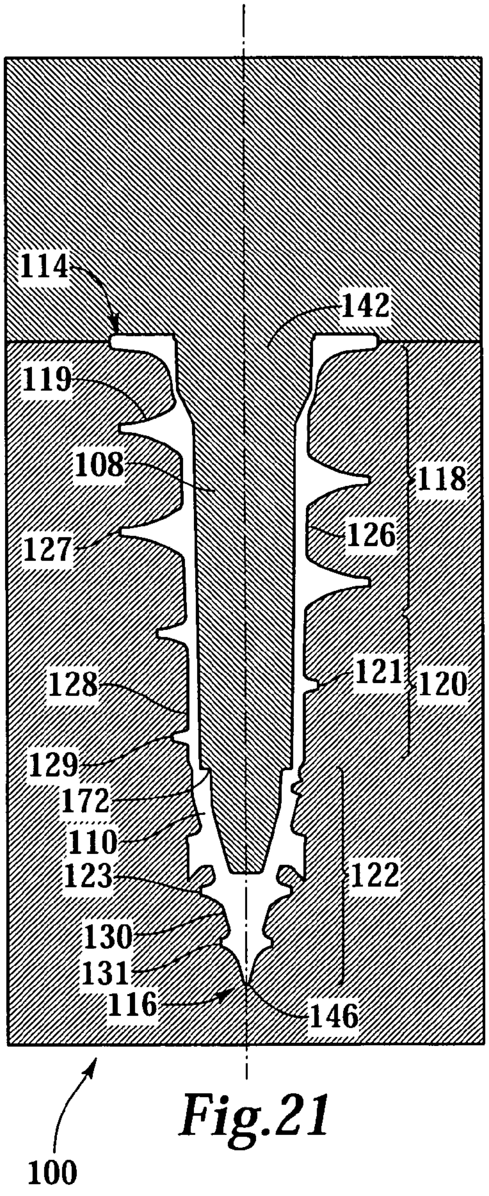
FIG. 21 is a side-sectional view of the mold closed for forming the self drilling anchor.

Turning to FIGS. 20 and 21, a method of making anchor 10 comprises the steps of providing a mold 100 having a cavity 110 with a flared end 114, a proximal section 118 proximate flared end 114, an intermediate section 120, a distal section 122, a second end 116 generally opposite flared end 114, and an elongated core 108 extending into cavity 110 at flared end 114, wherein proximal section 118 has interior threading 119 with a root 126, a crest 127 with a crest diameter MDC, and a thread height MDT, intermediate section 120 has interior threading 121 with a root 128, a crest 129 having a crest diameter MMC substantially smaller than first section crest diameter MDC, and a thread height MMT substantially smaller than first section thread height MDT, distal section 122 has interior threading 123 with a root 130 that tapers toward second end 116, a crest 131 having a crest diameter MTC substantially smaller than first section crest diameter MDC, and a thread height MTH substantially smaller than first section thread height MDH, feeding molten material, such as a zinc alloy, into cavity 110, setting the molten material to form anchor 10, and removing anchor 10 from mold 100.

Mold cavity 110 has the same shape as anchor 10 so that when the material sets, anchor 10 is formed. Specifically, flared end 114 of mold forms flared end 14 of anchor 10, second end 116 of mold forms drilling tip 16, proximal section 118 forms proximal portion 18, intermediate section 120 forms intermediate portion 20, distal section 122 forms distal portion 22, and elongated core 108 forms axial bore 8.

The novel anchor of the present invention allows a user to install the anchor in drywall without being concerned about whether or not a member is located behind the drywall at the anchoring location or, as may be the case, when it is known that there is a member present. The anchor also allows the user to use mounting fasteners of varying lengths because the mounting fastener tip can be extended past the drilling end of the anchor.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A method of installing an anchor and an elongated fastener in a friable material having a thickness and mounted on a member, comprising the steps of:

providing an elongated anchor having an axis, an axial bore adapted to receive an elongated fastener, a flared end having torque transmitting surfaces therein, a proximal portion, on intermediate portion, a distal portion, and a drilling tip generally opposite said flared end;

said proximal portion having a threaded exterior with a root, a crest diameter, and a thread height;

said intermediate portion having a length, a threaded exterior with a root, a crest diameter substantially smaller than said crest diameter of said proximal portion, and a thread height substantially smaller than said thread height of said proximal portion;

said distal portion having a length, a threaded exterior with a root that tapers toward said drilling tip, a crest diameter substantially smaller than said crest diameter of said proximal portion, and a thread height substantially smaller than said thread height of said proximal portion; wherein a combined length of the intermediate portion and the distal portion is larger than the thickness of the friable material;

driving said anchor into said friable material so that said distal portion drills through said friable material and into said member, and said proximal portion threaded exterior engages said friable material; and inserting said elongated fastener into said axial bore.

2. A method according to claim 1, wherein said elongated fastener has a tip and said drilling tip of said anchor extends to an original position before said step of inserting said elongated fastener into said axial bore, further comprising the step of extending said elongated fastener tip beyond said original position of said drilling tip.

3. A method according to claim 1, wherein a strengthening member is disposed on said body;

and wherein the exterior thread and said strengthening member together provide sufficient structural support to said body for said body to withstand a torsion force during said driving.

4. A method according to claim 1, wherein a distal portion of the anchor body proximate the drilling end is frangible, such that the step of inserting the fastener into the axial bore causes the distal portion to at least partially separate from said body.

5. A method according to claim 1, wherein the axial bore of said anchor has a first diameter proximate the proximal end and a second diameter proximate the drilling end, the first diameter being greater than the second diameter, and the second diameter being less than the outer diameter of threads of the fastener, such that the step of inserting the fastener into the axial bore causes the distal portion to at least partially separate from said body.

6. A method according to claim 1, wherein said body has a flange at the proximal end having torque transmitting surfaces and at least one weakening element, such that the flange separates from said body when the drilling end drills into the substrate.

7. A method of installing an anchor and an elongated fastener in a friable material mounted on a member, comprising the steps of:

providing an elongated anchor having an axis, an axial bore adapted to receive an elongated fastener, a flared end having torque transmitting surfaces therein, a proximal portion, a distal portion, and a drilling tip generally opposite said flared end;

said proximal portion having a threaded exterior with a root, a crest diameter, and a thread height;

said distal portion having a length, a threaded exterior with a root that tapers toward said drilling tip, a crest diameter substantially smaller than said crest diameter of said proximal portion, and a thread height substantially smaller than said thread height of said proximal portion, wherein the length of the distal portion is larger than the thickness of the friable material;

driving said anchor into said friable material so that said distal portion drills through said friable material and into said member, and said proximal portion threaded exterior engages said friable material; and inserting said elongated fastener into said axial bore.

* * * * *